US009198044B2

(12) United States Patent
Solondz

(10) Patent No.: US 9,198,044 B2
(45) Date of Patent: Nov. 24, 2015

(54) FRONT END FILTER CONTROL FOR SHARED ACCESS SYSTEM

(71) Applicant: VERIZON PATENT AND LICENSING INC., Basking Ridge, NJ (US)

(72) Inventor: Max A. Solondz, New Vernon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/202,901

(22) Filed: Mar. 10, 2014

(65) Prior Publication Data

US 2015/0257007 A1  Sep. 10, 2015

(51) Int. Cl.
*H04W 12/08* (2009.01)
*H04L 9/32* (2006.01)

(52) U.S. Cl.
CPC .............. *H04W 12/08* (2013.01); *H04L 9/3234* (2013.01)

(58) Field of Classification Search
CPC .............. H04L 63/0428; H04L 9/3226; H04L 2209/80
USPC ........................................................ 713/154
See application file for complete search history.

(56) References Cited

U.S. PATENT DOCUMENTS

| 5,703,950 | A  | * | 12/1997 | Jovanovich et al. | ........... | 380/249 |
|---|---|---|---|---|---|---|
| 6,628,626 | B1 | * | 9/2003 | Nordgaard et al. | ........... | 370/277 |
| 7,532,723 | B2 | * | 5/2009 | Chitrapu et al. | ................ | 380/44 |
| 8,014,337 | B2 | * | 9/2011 | Rao et al. | ....................... | 370/319 |
| 8,270,602 | B1 | * | 9/2012 | Forman et al. | .................. | 380/44 |
| 8,306,550 | B2 | * | 11/2012 | Sadek | ........................... | 455/454 |
| 8,411,766 | B2 | * | 4/2013 | Wu et al. | ....................... | 375/260 |
| 8,442,468 | B2 | * | 5/2013 | Reial | ............................ | 455/272 |
| 2014/0108786 | A1 | * | 4/2014 | Kreft | ............................ | 713/156 |

OTHER PUBLICATIONS

IEEE Std 802.11™-2012, Mar. 29, 2012, 2793 pages.*
'IEEE 802.11y-2008'. Wikipedia [online] [retrieved on Apr. 8, 2014]., IEEE 802.11y-2008. Wikipedia [online] [retrieved on Apr. 8, 2014].

* cited by examiner

*Primary Examiner* — Saleh Najjar
*Assistant Examiner* — Oleg Korsak

(57) ABSTRACT

The described examples are usable in an authorized shared access system to provide a front end sub-band filter system and method that securely allows the selection of a front end sub-band filter for receiving signals in a shared radio frequency spectrum (SRFS). A controller manages allocation of communication channels in the SRFS using an encrypted signal. The encrypted signal is only decrypted by a filter controller of a filter selection system. Based on the decrypted signal, the filter controller instructs a filter switch which band pass filters are to be incorporated into a front end communication path. The encrypted signal prevents unauthorized users from accessing a communication channel, and the selection of a specific sub-band filter prevents transmitter interference into other communications channels in other sub-bands, and prevents the reception of signals or interference from other communications channels in other sub-bands.

20 Claims, 12 Drawing Sheets

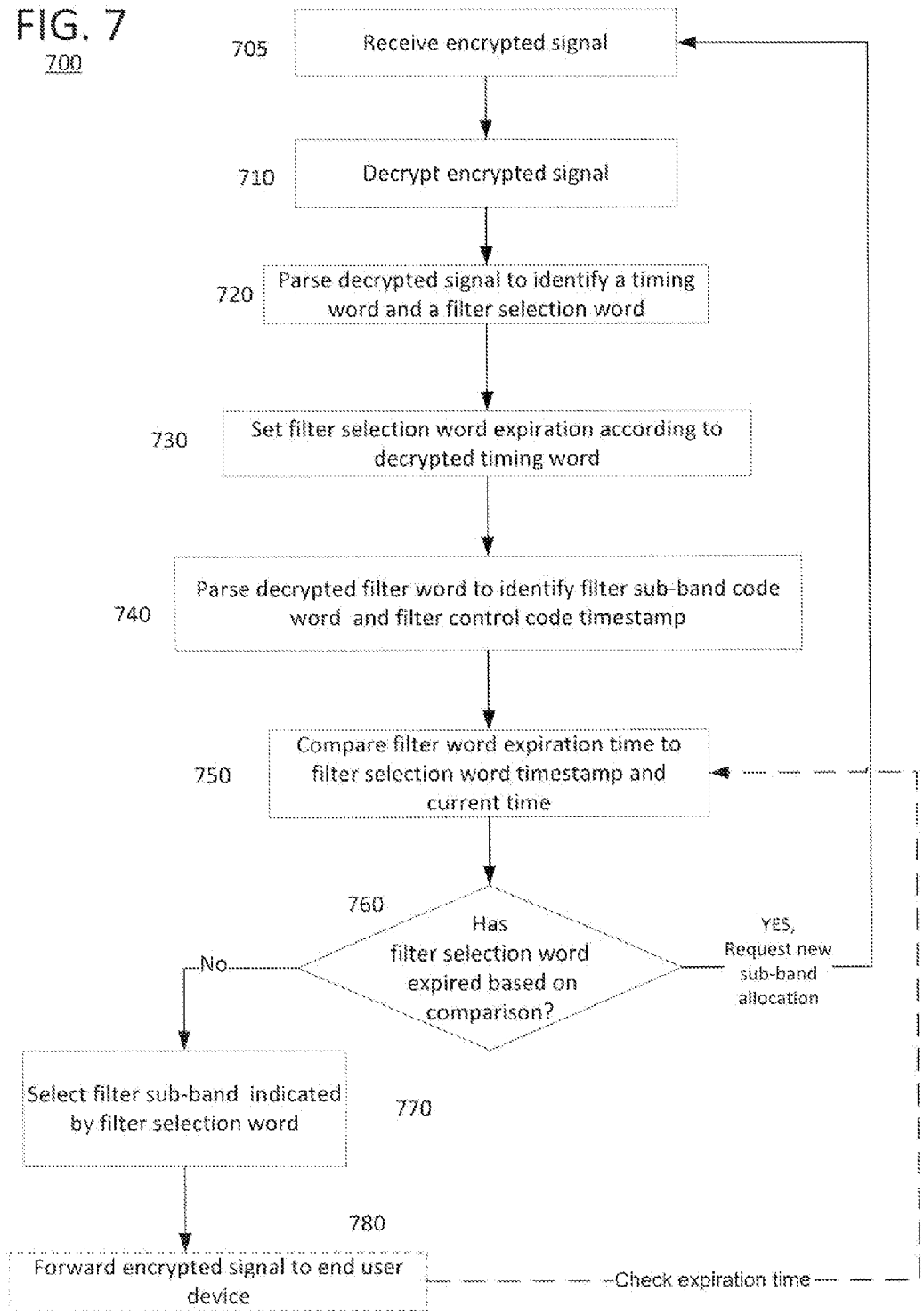

FRONT END FILTER CONTROL FOR SHARED ACCESS SYSTEM

BACKGROUND

In recent years, there have been proposals to allow multiple tiers of users to share access to radio frequency spectrum that is presently unlicensed or only used by a current licensee on an as-needed basis. A present proposal would authorize a set of channels within an available range of frequencies in a shared radio frequency spectrum model. In this shared radio frequency spectrum model, a set of channels may be at any frequency within the recently made available larger frequency band. In other words, for example, a license may be purchased for a 10 kHz channel in the frequency range of 20 MHz-22 MHz. Under a proposed licensing arrangement, any device would be allowed to operate within the 20-22 MHz range, but only on a temporarily assigned 10 kHz channel within the range. This new licensing proposal is like a general seating arrangement in a baseball stadium, where an outfield general seating ticket is purchased and the ticket holder is seated anywhere the usher directs so long as it is in the outfield bleachers section of the baseball stadium, as opposed to purchasing a designated specific seat ahead of time. In other words, the user does not choose a specific seat in a general seating arrangement, and similarly, a user in the shared access radio frequency system would not have a statically assigned channel or set of channels at a specific frequency, but instead would have a potentially different channel assigned from time to time. In these Shared Access Systems (SAS), a SAS Manager is employed to allocate channels among the various users. The SAS Manager is typically an external controller (or network of controllers or servers) located at a remote location where Internet Protocol communications (IP) are used to link the local device, Access Point, or Base Station device to the SAS Manager. This SAS arrangement is quite different than present exclusive use licenses, where fixed, defined portions of frequency spectrum in a fixed area or jurisdiction are assigned for a fixed term to a licensee.

An initial proposal establishes a tiered priority access system for the SAS. The first tier (Tier 1) is reserved Government and military incumbent operations who are the highest priority and the highest power-emitting users. The next tier (Tier 2) may be Priority Access/Commercial Wireless Network Providers (e.g. Verizon®, AT&T® and the like), who are proposed to have a mid-level priority and may have medium power emission levels, and the third tier (Tier 3), known as General Authorized Access (GAA) which would have the lowest priority and lowest power emission levels. The most extreme example of the dynamic range problem is a Tier 1 user that uses a radar air interface at very high power sharing a set of channels with a commercial wireless wide area network (WWAN) network, such as using the 4G Long Term Evolution (LTE) air interface at low powers commensurate with a small cell implementation. Because the radar system is operating at a very high power level, many channels of operation for the lower powered WWAN system may experience front end overload interference. This interference may affect the use of channels that are co-channel (i.e., share a portion of the same channel), adjacent channel, next adjacent channel, and any channel that is in the bandwidth of the receiver front end. This is because the high power signal of the radar may overload the front end (receiver's) low noise amplifier (LNA) and subsequent mixer stages before the later filtering in the receiver occurs (in order to select the actual reception channel). This is often termed front end 'Blocking' where a high power signal within the radio frequency bandwidth of the receiver front end degrades, desensitizes, or completely overwhelms reception of the desired low level signal. Because the radar system has a very high power amplifier and a very high gain, narrow beam width antenna, the area covered by the radar signals may be very large, precluding or excluding operation of the other lower powered systems over very wide areas. These exclusion zones not only prevent operation of the lower powered systems on the same channel, but also prevent operation on many other channels due to the front end overload condition, where the low power receiver LNA is driven past its linear operation point.

Hence a need exists for a system that minimizes the chances of blocking lower power devices by segregating the frequency bands through the use of filtering and by secure control of this operation to prevent unauthorized users from interfering with authorized users.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3C are examples of channel plans of the shared frequency spectrum that may be used by the authorized shared access system.

FIG. 7 is a flowchart of an example of a process implemented in an example of a tuning controller used with the described authorized shared access system.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples of the filter control system disclosed herein relate to a system, method and device for managing channel allocations in a shared access radio frequency spectrum environment to minimize effects of other users' device emissions on one another. In particular, the disclosed examples provide a device for securely managing the selection of the reception and transmission communication channels for use by a lower power device, and selectively implementing associated sub-band filtering in order to reduce or eliminate reception of high powered signals generated in communication channels being used by the high powered users.

Figure 1:
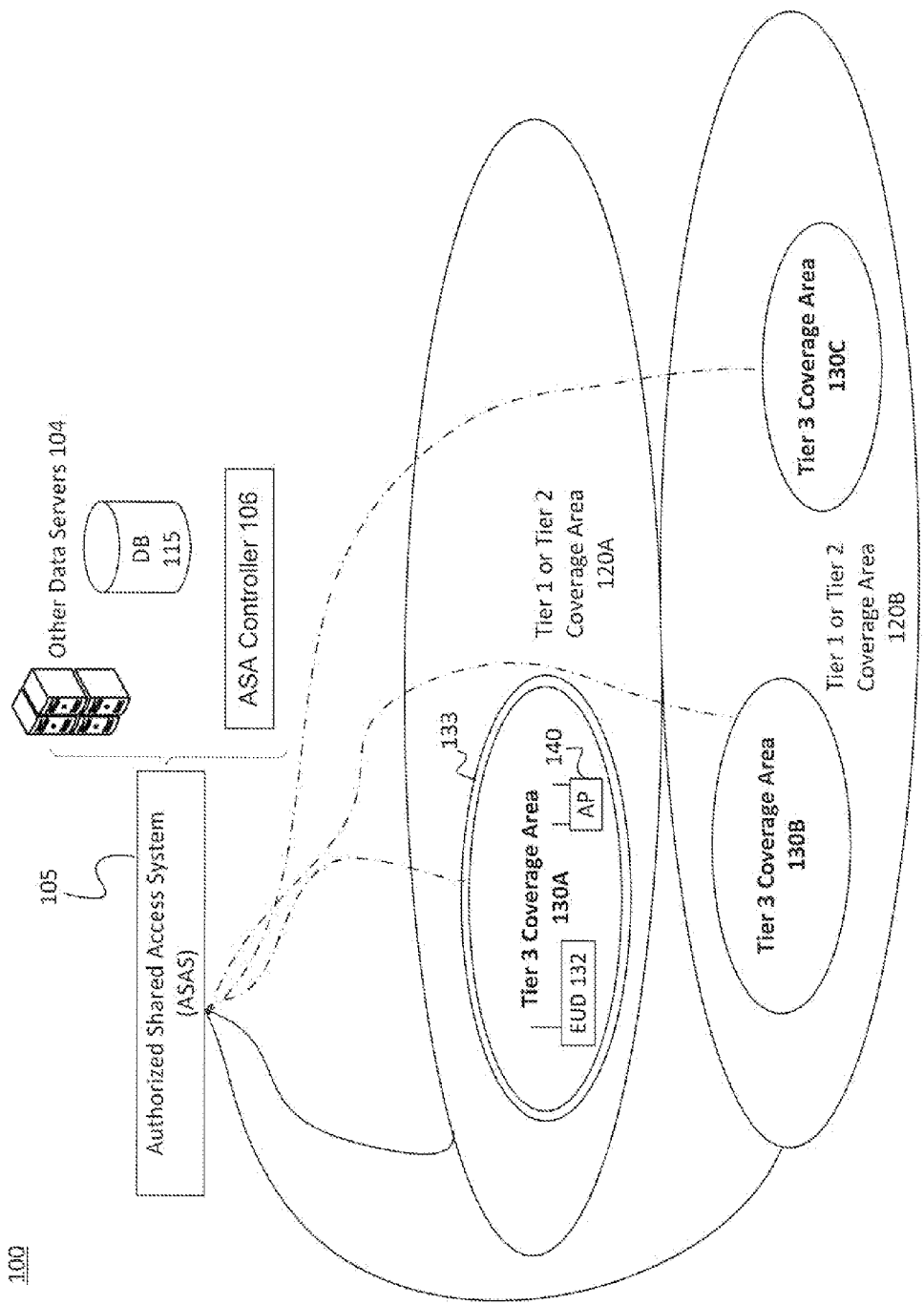
FIG. 1 is a conceptual diagram illustrating an example of areas that would be provided with radio frequency coverage for lower tiered users within coverage areas of higher tiered users in an authorized shared access system.

Reference now is made in more detail to the examples illustrated in the accompanying drawings and discussed below. FIG. 1 illustrates is a conceptual diagram illustrating an example of areas provided with radio frequency coverage for lower tiered users within coverage areas of higher tiered users in an authorized shared access system. Geographical areas within the radio frequency coverage regions allocated for use by the Tier 1 and Tier 2 users may have smaller coverage areas carved out for use by Tier 3 users, such that the Tier 3 users will not interfere with use of the spectrum by the Tier 1 and Tier 2 users in the remaining area of the coverage area.

The shared radio frequency spectrum management system 100 may be implemented by an Authorized Shared Access System (ASAS) 105. The ASAS 105 may be coupled to other data servers 104, one or more ASA database(s) 115, and one or more ASA controller(s) 106. The other data servers 104 may provide data to the ASA controller 106 and database 115 regarding Tier 1 and Tier 2 users, devices or systems that may be in operation in geographical regions in which the ASAS 105 allocates the channels to the different Tier users and thereby provides access to the shared radio frequency spectrum communication channels. For example, as shown in FIG. 1, under control and management (described in more detail later) of the ASAS 105, the shared radio frequency spectrum communication channels allocated by the ASA controller 106 to the Tier 1 or, under license, to Tier 2 users in certain coverage areas, such as 120A and 120B, may have smaller coverage areas, such as 130A-C, within respective coverage areas 120A and 120B in which specific radio frequency communication channel(s) is (are) temporarily turned over to Tier 3 users for non-interfering use. The ASAS database 115, for example, may maintain and store updates of shared radio frequency spectrum communication channel allocations, Tier 1/2/3 device locations and activity as well as potential future activity and other data, such as Tier 1 or Tier 2 device properties, such as power emission levels, signal propagation maps related to different Tier 1/2/3 devices and the like. Under control of the ASAS 105, the shared radio frequency spectrum may be shared in respective coverage areas 120A and 120B in a more efficient, and non-interfering manner.

The coverage areas 120A and 120B may be assigned to the respective Tier 2 users based on a licensing process. For example, Mobile Network Operator A (MNO A) may obtain a license from the Federal Government to be a provider of services in the ASAS (as a Tier 2 user) for Somerset County, N.J. The coverage area 120A under the terms of the MNO A license may cover all of Somerset County, N.J. Alternatively, the license may be for a number of small, but adjacent geographical areas the boundaries of which extend to edges of coverage area 120B. The methodology used by the ASAS 105 to determine the smaller Tier 3 coverage areas 130A-C will be described in more detail below, and since Tier 3 is unlicensed a more sophisticated approach to determining coverage areas 130A-C may be used.

In order to determine the Tier 3 coverage areas 130A-C, the ASAS system 105 may have stored in the ASAS database 115 information related to when the Tier 1 and Tier 2 users are scheduled to use communication channels (which may be all available communication channels) of the shared radio frequency spectrum in a particular location. Based on this data in the ASAS database 115, the ASA controller 106 may determine Tier 3 coverage areas (e.g., 130A-C) within the respective coverage areas 120A and 120B that are assigned to the Tier 1 or 2 users based on the communication channel allocated to the respective Tier 3 user device as shown in FIG. 1.

For example, in the example of FIG. 1, the Tier 3 access point (AP) 140 and its served EUDs (132) are examples of an implementation that provides shared radio frequency spectrum coverage for lower priority (i.e., Tier 3) users in the ASAS. Generally, the ASAS 105 has determined that the Tier 3 coverage areas, such as 130A, 130B and 130C, are available for non-interfering use of the shared radio frequency spectrum (i.e. AP 140 and EUD 132 will not interfere with a higher tier user elsewhere in coverage area 120A). The determination may be made by algorithms executing on the ASA controller 106 or other data servers 104 based on user device information stored in DB 115 or available from the other data servers 104. For example, some Tier 1 users (i.e., non-military/police users) may provide advanced notice of location of Tier 1 device use in a particular coverage area to the ASAS 105. This location information is stored in the DB 115. In addition, the locations of Tier 2 mobile network operators (MNO) base station transceivers (BTS) are typically fixed at a particular position known to the MNO. The locations of the BTSs may also be stored in the DB 115. Finally, all Tier 3 APs include a GPS system, or similar location reporting system, that reports the respective locations of the devices to the ASAS 105. The DB 115 may also store, or the other data servers 104 may have access to device operation information such as signal power levels, shared radio frequency spectrum channel and/or sub-band allocation, duration of the channel and/or sub-band allocation, closest Tier 1/2/3 devices, and the like. Using the stored device location and device operation information, the ASA controller 106 may apply different propagation modeling techniques (discussed in more detail below) to determine an optimal channel and/or sub-band allocation for each device in the ASAS. In addition, the ASA controller 106 may also inform the AP 140 to transmit at a specific transmit power level. The AP 140 is informed, by the ASA controller 106, of the availability of spectrum in the coverage area 130A including the channel and/or sub-band allocated to the AP 140, which begins operating in the allocated channel and/or sub-band to provide data service to the served EUDs.

Regardless of the propagation modeling techniques used to determine coverage areas, keep-out areas and device power levels, as mentioned above, the ASAS 105 may also instruct the AP 140 to stop transmitting in the coverage area 130A because a higher priority user (e.g., a Tier 1 military users) needs the channel for high powered emissions, such as a pulsed radar, or will be emitting high powered radio frequency in a channel(s) adjacent to the channel that the AP 140 and its EUDs are currently using to communicate. The ASAS 105 may have significant advanced notice (e.g. months or several days' notice) that a Tier 1 user will be in the vicinity, such as coverage area 120A, of Tier 3 devices, and will need the entire coverage area 120A at a particular time and duration for the Tier 1 activities. Tier 1 activities may include the use of high powered signals within the frequency bands of the shared radio frequency spectrum that may potentially interfere with, or damage, the Tier 3 devices. Alternatively, the ASAS 105 may have little, or substantially no, advanced warning of the Tier 1 user's high powered use of a channel allocated to the Tier 3 AP 140 and its EUDs. In the case of significant advanced notice, the ASAS 105 can provide a schedule of when the AP 140 and EUD 132 should shutdown, while in the case of abrupt notice, the AP 140 and EUD 132 may be informed to immediately cease use of the allocated channel and/or sub-bands. The propagation modeling techniques may also be used to determine keep-out areas 133, which are areas surrounding the periphery of the coverage areas. Keep-out areas are areas in which any devices in those areas will likely experience interference and/or reduced quality of service.

In the spectrum sharing paradigms that may be implemented, the unlicensed Tier 3 users may have the following impact. Firstly, the unlicensed Tier 3 access points (APs) and end user devices (EUDs) will likely operate at low power commensurate with FCC regulation part 15 related to unlicensed device power levels or similar low power constraints. While Tier 1 and 2 user devices will likely emit signals at higher power levels than the Tier 3 APs and EUDs. Secondly, the Tier 3 APs and EUDs are not under the direct control of a wireless service provider network (WSPN). Examples of WSPN include cellular carriers that provide global system for mobile communication (GSM) systems, code division multiple access (CDMA) systems, universal mobile telecommunications systems (UMTS), or LTE systems for data and voice communications. A WSPN wireless air interface (WAI) typically has a separate control layer that controls authentication of handsets, billing and identification information, air interface resource control (channel allocation), and management of the interface to the wireless network, and a separate data layer that handles the exchange of data between devices. However, unlike GSM, CDMA, UMTS, and LTE WSPN systems, the Tier 3 users may likely be under a different WAI that may not have a control layer and a data layer similar to the WSPN layers. Instead, a Tier 3 AP or EUD may be more similar to a Wi-Fi air interface, where there is neither a centralized wireless network control plane nor an organized wireless network.

For Tier 3 devices, this lack of a centralized WSPN control plan raises a number of issues in the context of sharing spectrum between Tier 1, 2 and 3 users. For example, sharing may require the use of the ASAS 105 via the ASA controller 106 to properly allocate spectrum within the various regions, in order to share the resources among different tiers of users, and also to avoid co-channel interference. In an example, each of the Tier 1 and 2 user devices may provide information related to the respective devices to the ASAS 105. For example, each device may provide a location of the device (if a static device), a time of starting use of the spectrum, a duration of the use, an estimated position and estimated time at the estimated position (if a mobile device), transmit signal power level, and the like. The Tier 1 user, for example, may be a commercial or military aircraft that will be traveling along a pre-approved flight path or the like. The controller of the respective user devices may also indicate the amount of spectrum of the shared band that will be used by the user's device. The Tier 3 users which have the lowest priority among the three tiers are allocated any spectrum that is left over by the Tier 1 and Tier 2 users.

For example, the ASA controller 106 with reference to the ASA database 115 may allocate communication channels of shared spectrum based upon the requests (from Tier 1 and 2 users) for allocation (time, amount of spectrum desired, and location). Geographical location dependency assures that the channel allocation does not interfere with any higher priority users operating in the vicinity of the location. Based upon location, the ASAS system 105 may use a propagation model to determine the next closest allowed co-channel use and hence the communication channel allocations and the respective coverage areas 130A-C for the respective devices.

For example, the ASAS 105 may use one or more types of RF propagation modeling methods to determine the effects of certain communication channel allocations and transmit signal power levels in a particular coverage area, and to subsequently allocate the communication channels. A first type of propagation model (i.e. physics approach) uses ray tracing methods, electromagnetic simulations, penetration modeling, scattering/diffraction/polarization modeling, field of view, and the like. These methods are not only computationally intensive but also require a large number of location and material constants data, such as accurate terrain and topography data, building locations and dimensions, interior wall details, street locations, other objects (cars and trucks), vegetation (leaves are important), reflection, conduction and dielectric properties for materials (glass, brick, metals, wood) data), as well as the more conventional parameters of the transmitter and receiver (locations, TX power, RX sensitivity and noise figure, antenna gains, antenna patterns, antenna heights). These models are generally not employed because of these difficulties. A second type of propagation model is an empirical model, which are generalized equations (curve fits) of a 'case' of measurements. Examples include Okumura, Hata, COST-Hata, and Longley-Rice models. Typically, a general case is defined (such as outdoor, rural, with few buildings and open spaces), a measurement campaign (e.g., measuring devices are deployed in an area of interest) is conducted to collect a large data set over a small set of varying parameters. Generally, these parameters only include the path loss parameters (distance, frequency), and the antenna parameters (transmitter height and receiver height). A curve fit is used to derive an equation where these parameters can be varied to determine an average path loss number for that set of parameters (frequency and distance) and conditions (case, antenna heights). Thus these empirical models are not generally useful for predicting specific losses in a specific instance, but are useful as a conservative estimate for the aggregate or mean path loss value within a coverage area. A third option, the spectrum sensing database approach, is to use a spectrum sensing method, where the devices are used as in situ receivers to determine interference levels from nearby radiators, and this information is used to populate a database. A fourth option is to use a hybrid combination of the spectrum sensing database model and the empirical model. For example, when determining coverage area 130A of FIG. 1 for a Tier 3 device, the ASA controller 106 may initially start with the device's propagation result from using the empirical model, and the ASA controller 106 would use this propagation result for the device if no other data for the device were available. If the ASA controller 106 also had spectrum sensing data within its database, it would replace the calculated estimate with the measured estimate and then use this to determine the proper reuse distances and channel allocations to best avoid interference with the Tier 3 device. Alternatively, and more conservatively, in order to avoid interference, the hybrid model may choose the longer propagation distance range based upon the two separate estimate methods for that particular device. Alternatively, for more liberal reuse, in order to maximize overall capacity, the hybrid model may choose the shorter propagation distance range based upon the two separate estimate methods for that particular device.

The ASAS 105, when determining communication channel allocations and the subsequent coverage areas, such as 130A-C, may use either a propagation modeling approach or a spectrum sensing database approach. In the propagation modeling approach, the ASAS 105 database may include Tier 1, Tier 2 and Tier 3 device locations, respective device parameters, such as signal power levels, assigned channels, and the like, and apply signal propagation models based on known or expected power output levels of the respective devices in a proposed coverage area to determine whether a requesting Tier 3 device can be granted access to available spectrum, and also the extent of the coverage area provided for the requesting Tier 3 device. Based on the results of the determination, the ASA controller 106 may grant or deny access to the communication channels by the Tier 3 device requesting use of the shared radio frequency spectrum in the proposed coverage area. In the spectrum sensing database approach, the Tier 3 APs and/or Tier 3 EUDs may use scanning receivers to measure the channels of interest and report back to the ASA controller 106 measurements that indicate whether or not interference from other co-channel devices are detected at their present location. Also, a hybrid approach may be employed, where both the propagation modeling (using a propagation model calculation described above) along with spectrum sensing reports from the Tier 3 AP/EUDs and resultant database are used in combination to determine the communication channel allocations to the Tier 3 AP/EUDs for the respective coverage areas 310A-C.

Whether the modeling approach, the spectrum sensing database approach or the hybrid approach to communication channel allocation is used, the communication channel allocation is based on the capabilities of the requesting Tier 3 device and the capabilities of any Tier 1/2/3 devices known to be in the vicinity of the requesting Tier 3 devices. For example, if there are a number, say three or more, of spectrum sensing Tier 3 devices in the known vicinity, the spectrum sensing approach may be chosen since the three or more Tier 3 devices can provide actual received signal strength data exclusive of or in addition to any modeling data retrieved from the propagation models. Therefore, if a suitable number of spectrum sensing capable devices are present in a coverage area, it may be more beneficial to use either the spectrum sensing approach or the hybrid approach.

Figure 2A:
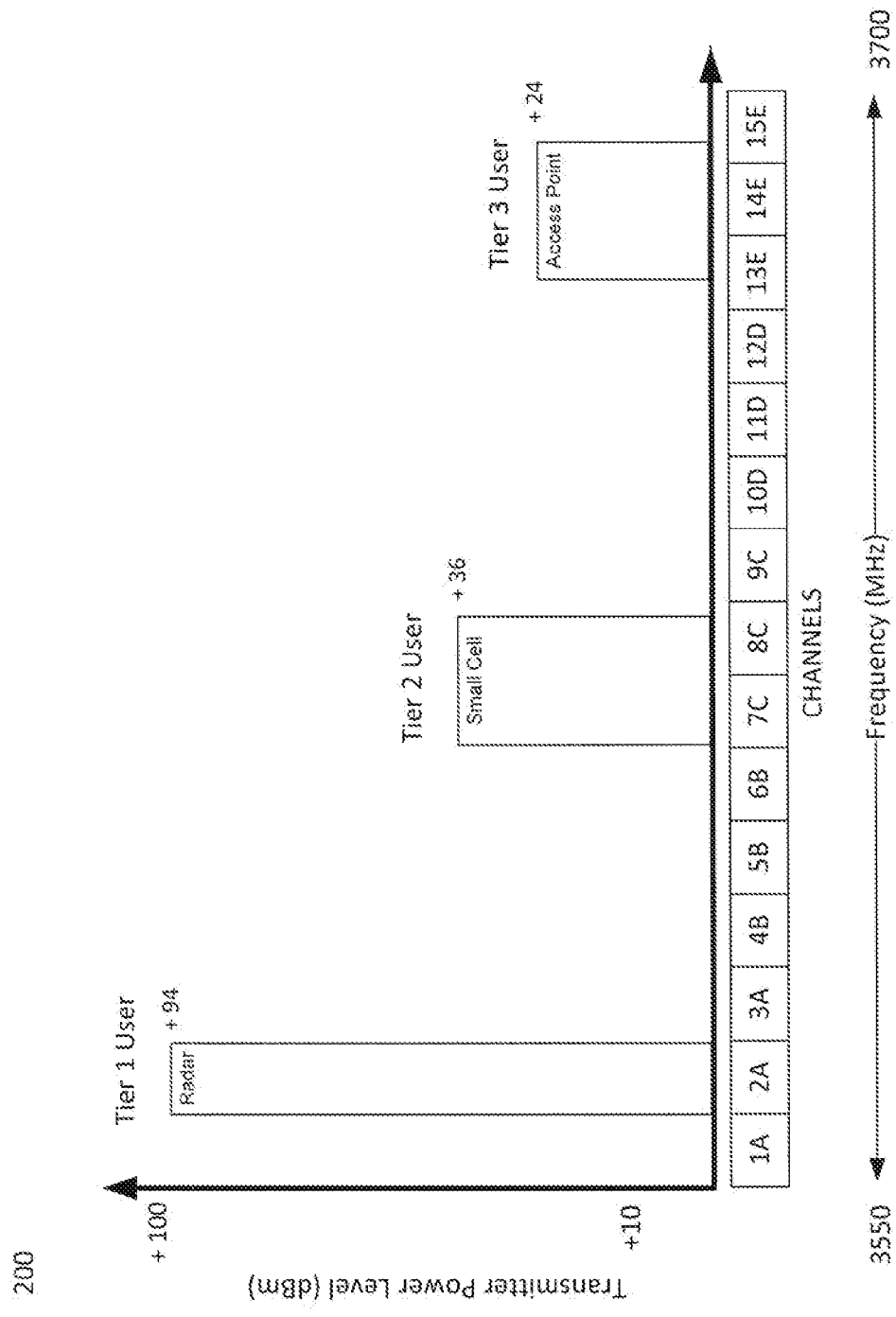
FIG. 2A provides an example of interactions between a high power emitting user, a medium power emitting user and a low power emitting user of shared frequency spectrum that will be provided by the authorized shared access system.

FIG. 2A provides an example of a comparison of typical varying power levels between a high power emitting user, a medium power emitting user and a low power emitting user of shared frequency spectrum that will be provided by the authorized shared access system. For example, FIG. 2A shows a case of a coverage area containing three different tiers (1, 2 and 3) of users using three different air interfaces (or use cases) at three different operating power levels and on different channels. The graph 200 has a Y-axis representing transmitter power levels in decibels (milliwatt) (dBm) and an X-axis representing frequency from 3550-3700 MHz (or channels 1-15 arranged into 5 equal sub-bands of A-E). In this example, a 'Tier 1' user (high power, high priority, incumbent user), such as a high power radar is operating in the area at +94 dBm EIRP (effective isotropic radiated power level) within channel 2A (e.g., 3560-3570 MHz). In the coverage area, a 'Tier 2' (medium power, Priority Access) user (e.g., a Mobile Network Operator (MNO)) is operating a 'small cell' at a power level of +36 dBm with a 20 MHz wide long term evolution (LTE) carrier operating within channels 7C and 8C (3610-3630 MHz). In the same coverage area, a 'Tier 3' General Authorized Access (GAA) user is operating an access point device at a power level of +24 dBm EIRP within channels 13E, 14E and 15E (3670-3700 MHz), using, for example, a 22 MHz wide 802.11 Wi-Fi-like air interface.

All three systems (i.e., Tier 1 system, Tier 2 system, and Tier 3 system) are operating on different allocated channels and are hence not 'co-channel.' Due to the drastic differences in power levels of each system, however, the effective range of each system and their respective interference impacts on other systems are quite different. For example, because of the very high power levels of the Tier 1 radar system, the radar may saturate the front end of the other Tier 2 and Tier 3 systems' transceivers, most notably overloading the electrical components of the low noise amplifier (LNA) or first stage heterodyning mixer of the MNO base station (BTS), an end user device (EUD) of a small cell user, a Tier 3 Access Point transceiver or Tier 3 EUD transceiver.

Figure 2B:
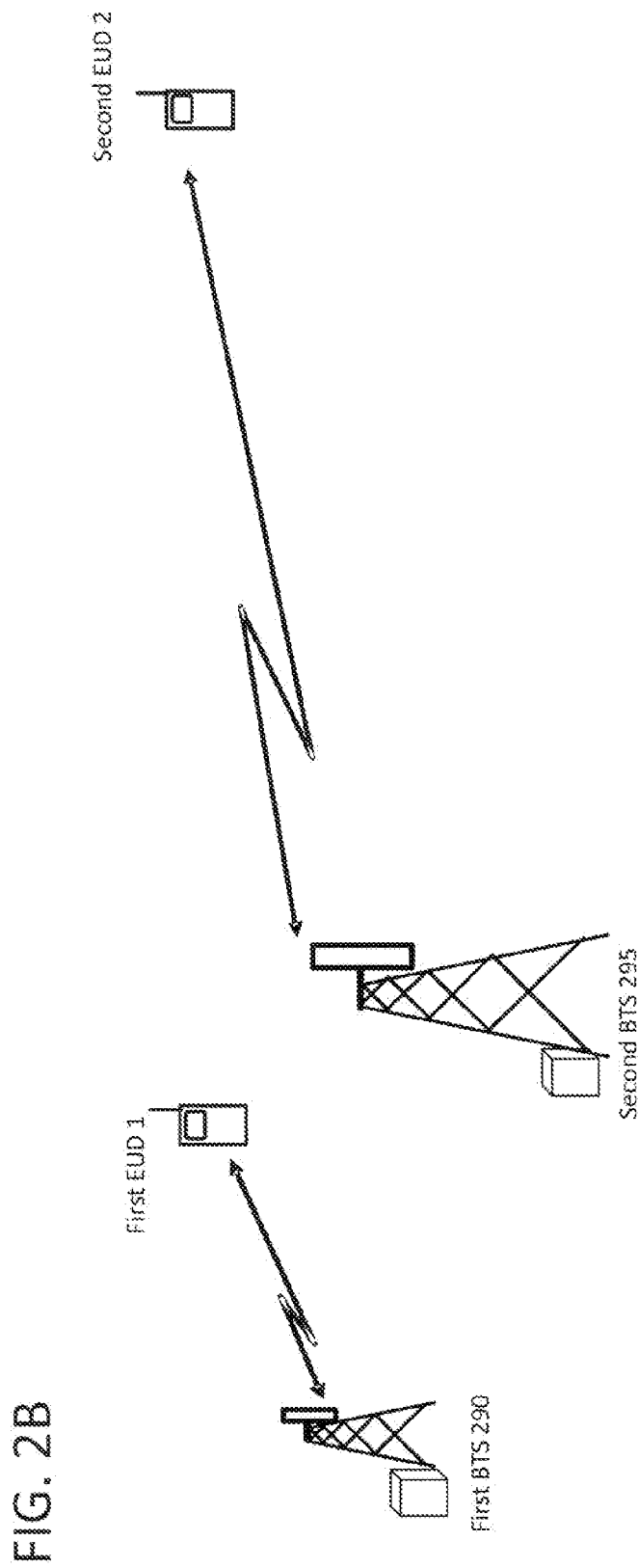
FIG. 2B illustrates an example of a near-far dynamic range problem that may occur in an authorized shared access system and that is addressed by the disclosed examples.

Another potential opportunity for interference, as shown in FIG. 2B, is the result of a near-far dynamic range problem that occurs when a nearby (first) EUD 1, assigned to a first MNO BTS 290, is emitting signals that are also received at a second MNO BTS 295 and these signals prevent reception by the second MNO BTS 295 of the second MNO BTS 295's own (i.e., second) EUD 2, which is farther away than the nearby first EUD 1. The faraway, second EUD 2 device may, for example, have a much lower power signal level as received by BTS 295, and the second MNO BTS 295 is desensitized by the higher power interfering signal from the nearby first EUD 1 transmitter. In other words, the nearby first EUD 1 effectively "blocks" the reception of the lower power signal from the faraway second EUD 2 by the second MNO BTS 295.

Figure 2C:
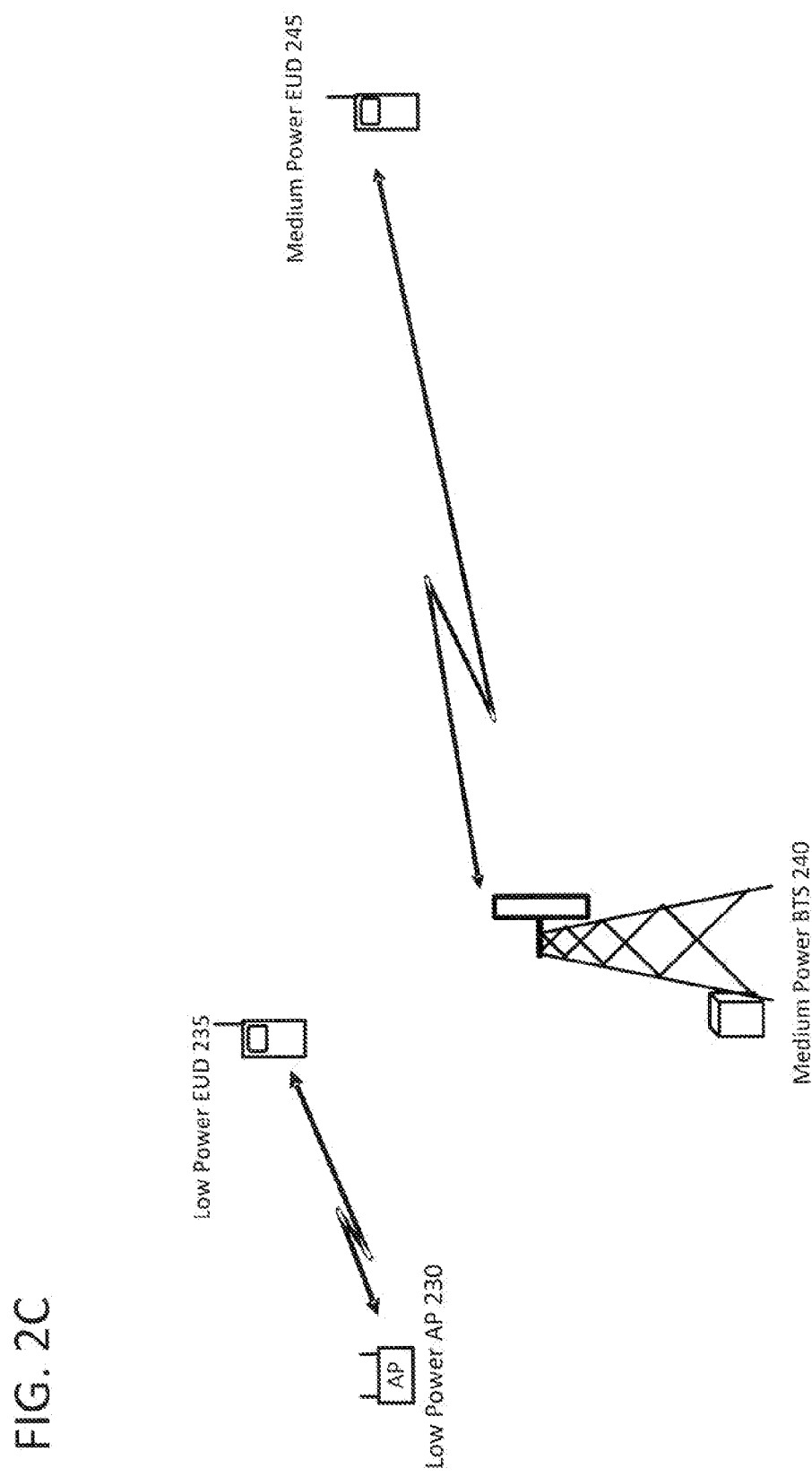
FIG. 2C illustrates an example of near-far and different power level interference that may occur between two different types of use cases in an authorized shared access system.

The ASA controller 106 may use its capability of selecting the appropriate sub-bands to manage different use cases within the same or nearby geographic areas. For example, FIG. 2C illustrates an example of two different use cases. Here, there are two nearby use case examples. The first use case example is that of Tier 3 GAA AP 230 and its served EUD 235. In this example, the respective AP 230 and EUD 235 may be under a power restriction for Tier 3 device, such as having a signal power of less than 30 dBm, and, as a result, the coverage area covers a small area. The second use case may be that of Tier 2 BTS 240 and its served EUDs, such as EUD 245. The Tier 2 BTS 240 may be a permitted to use medium power transmission that is above 30 dBm EIRP in order to cover a Tier 2 coverage area that is larger than a Tier 3 coverage area. Thus, besides the near-far problem of FIG. 2B that contributes to large dynamic range differences at a receiver, as discussed earlier, there is also the problem that the two different use cases have different allowable maximum transmitter power levels. Therefore, it may be more likely that AP 230 and EUD 235 receive interference from BTS 240. The interference, in some cases, may even be adjacent or next adjacent channel interference (assuming the two different use cases are not co-channel) because of the higher power of the BTS 240 or the EUD 245. In an example, if the ASA controller 106 not only allocated different (non co-channel) communication channels, but also allocated differing sub-bands, then the different use cases would be protected from one another by the additional rejection of the sub-band filters.

Many older systems used narrow band front end filters to segment the entire allocated bandwidth (the radio frequency (RF) block of frequencies) into sub-bands or sub-blocks. For example, if two different MNOs were sharing a Federal Communications Commission (FCC) designated RF block, each MNO might deploy with different filters designed to cover a given sub-band or sub-block of the total bandwidth allocation. These radios (base stations (BTS) or End User Devices (EUD)) would then be sub-band specific. This prevents the two systems from interfering with one another, and this approach eliminates the near-far dynamic range problem, where one MNO's BTS experiences blocking from a nearby device assigned to another BTS. By segregating the frequencies being used into the sub-bands, the front end band pass filters drastically reduce interference from the other MNO system, but limits the particular system to the segregated frequency or one specific sub-band of frequencies. This older system arrangement makes sharing spectrum between the two different systems impossible.

This limitation of operation to one specific designated sub-band was perfectly suited to the static exclusive use licensing model, where the licensee had exclusive use of that particular sub-band for a defined term. However, in the case of the ASA shared band, it is desired to share the entire allocated RF block among the different Tiers, users, use cases, and entities. Therefore, the flexibility of the described examples allow all of the devices to have the capability to tune anywhere in the band. But it is also desirable to avoid the high signal level blocking problem.

Another area of concern beyond interference is the potential threat of damage to components in the lower powered devices from the high power signals emitted by the Tier 1 users.

Another area of concern beyond interference is the potential threat of unauthorized signal transmission or unauthorized signal reception on the part of a Tier user who is not authorized by the ASA controller to operate on a particular allocated channel. Obviously, unauthorized transmission on a channel allocated to another authorized nearby user might interfere with proper operation and reception on the part of that authorized user. Additionally, the privacy and security concerns of a Tier 1 or Tier 2 user may require the ASA controller to prevent unauthorized reception or detection of other specific users or other tiers. The ASA controller may wish to prevent a specific user (Tier 2 or Tier 3) from passively receiving or detecting signals on a specific allocated communication channel (allocated to another user or Tier), or receiving or detecting any signals in a specific sub-band outside the user's own allocated sub-band. The use of a sub-band filter or switchable set of sub-band filters would allow the ASA controller to exclude operation on other sub-bands.

Figures 3A, 3B, 3C:
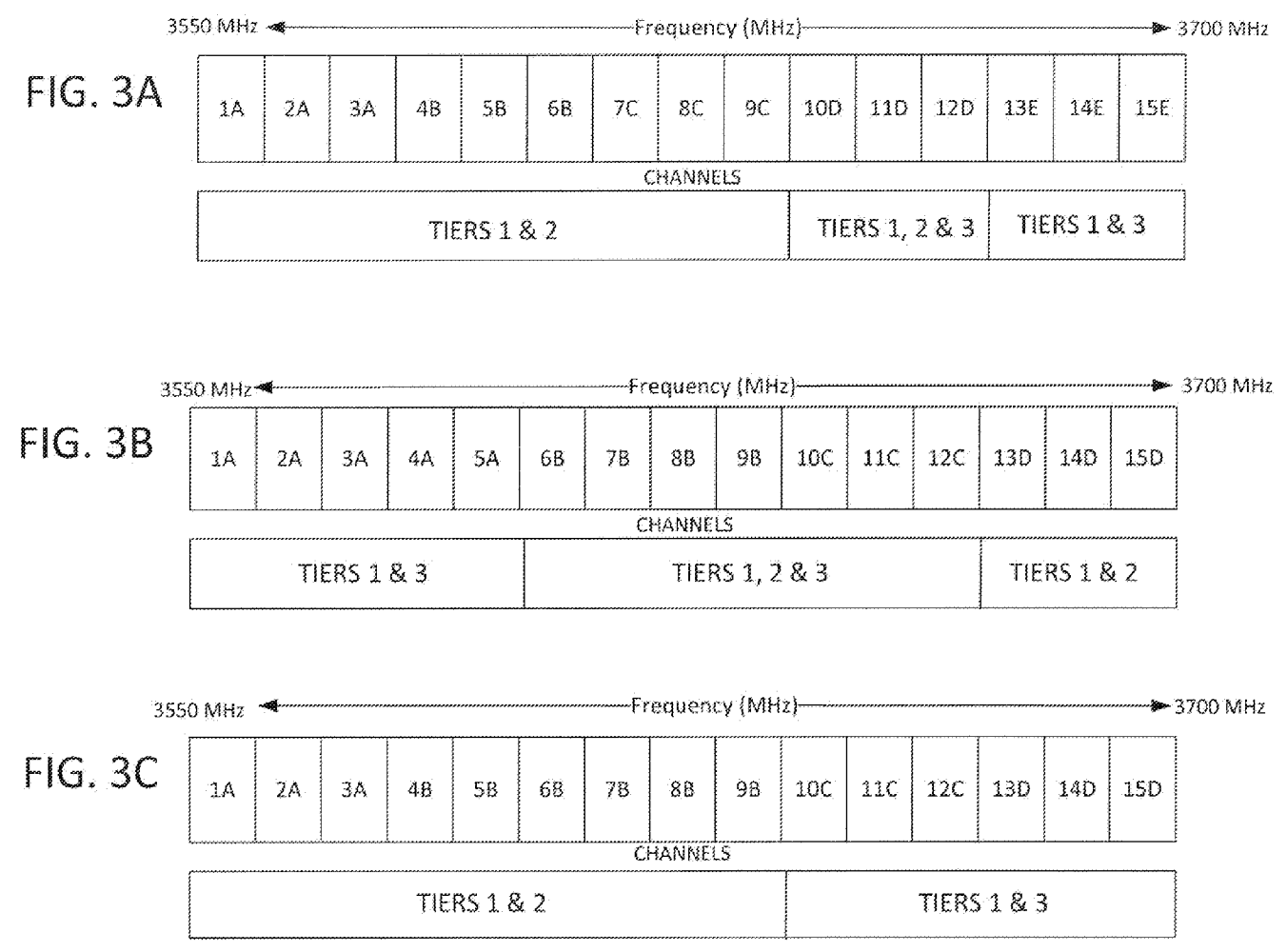

FIG. 3A shows an example of a channel plan for the 3550-3700 MHz frequency band. A communication channel may be a frequency (e.g., 3555.0 MHz, the center frequency of channel 1A), or frequency band (e.g., 3550.0-3560.0 MHz, the bandwidth of channel 1A), in which a signal having a particular encoding format is transmitted between a source (transmitter) and sink (receiver). The signals may be either data signals (e.g., signals carrying content that a user has presented to them) or control signals (e.g., signals that are used to control the operation of a connected device or components of the receiving device). A communication channel can either provide a downlink (DL) (e.g., from a network to an access point device, an access point to an end user device) or an uplink (UL) (e.g., from an end user device to an access point, or an access point to a network), or both. In a time division duplex (TDD) implementation, the communication channel can be the same radio frequency (RF) channel for both uplink and downlink at different times. While in a frequency division duplex (FDD) implementation, the uplink channel and the downlink channel are different at different RF frequencies but available at the same time so simultaneous transmission and reception may occur. Examples of time division duplex and frequency division duplex implementations will be described in more detail with reference to later figures.

In an example, the individual channels may be 10 MHz wide, and thus there are a total of fifteen designated communication channels in the entire RF block of frequencies. Of course, the channel width may be greater than or less than 10 MHz. In this example, as illustrated in FIG. 3A, the entire block of 150 MHz (e.g., 3550-3700 MHz) is broken into five separate equal sub-bands, here designated sub-bands A, B, C, D and E, and these sub-bands correspond to specific front end filters. Each sub-band, in the example, includes three communication channels, and therefore is 30 MHz wide. In some examples, the Tier 3 Access Points and EUD devices may have only one, two, three or four of the 30 MHz sub-band filters in order to restrict their operational range via hardware limitations. Of course, a sub-band may include more or less channels than another sub-band as shown in FIGS. 3B and 3C and this would depend upon the band plan.

In the example shown in FIG. 3A, fifteen 10 MHz channels, and the use of five equally sized sub-bands creates four borders. The borders prevent certain allocations. For example, referring to FIG. 3A, if a requesting Tier 2 MNO system, for example, wished to employ a 20 MHz wide LTE carrier, the ASA controller may not allocate to the Tier 2 MNO system two adjacent 10 MHz channels that span a sub-band boundary, such as allocating channels 6 and 7, together to form a 20 MHz allocation because channel 6 is within the bandwidth of the filter that corresponds to sub-band B and channel 7 is within sub-band C, these two channels (6 and 7) cannot be combined together because the device must switch between the defined sub-bands and cannot possibly use both channels simultaneously. This restricts some of the possible channel allocations the ASA controller 106 can use. It would be possible for different devices to have different numbers of sub-band filters with their filter banks (and not necessarily covering the entire whole band allocation).

Also, configurations are possible in which the different devices have different bandwidth sub-bands, although managing channel use allocations is therefore more complex on the part of the ASA controller 106. Such a non-uniform sub-banding arrangement, despite its complexity, may be useful in managing different use cases for different air interfaces. For example, the Wi-Fi air interface natively uses a 22 MHz wide bandwidth, so a sub-band filter narrower than this allocation is not adequate for that use case. For those devices intending to use narrower air interfaces (i.e., the sub-band is narrower), narrower sub-bands, even down to the width of one 10 MHz channel allocation, may be used.

If the ASA controller 106 can effectively corral similar use cases into one sub-band, then fewer sub-bands may be used for effective management. For example, if all the high power radars have encodings that allow them to not interfere with one another, and if they are commanded to operate, for example, in the lowest 20 MHz, i.e., channels 1 and 2, then the use of sub-band filtering can greatly enhance the use of the rest of the RF allocation. The sub-band boundaries need not be evenly spaced.

Note that both the AP and the EUD devices may be, alternatively, restricted only by software, firmware and the ASA controller 106 channel allocations to some subset of communication channels. Or the restriction may be achieved in hardware because the multiplexing filter bank of that device or device type may not include all of the available sub-band filters that are possible for the entire band.

In the example channel distribution in FIG. 2A, the whole block of shared radio frequency spectrum is shown as being broken into 15 channels and five equal 30 MHz wide sub-bands. In other implementations, such as those shown in FIG. 3A, the communication channels available to the Tier 3 APs and EUDs may have only one (sub-band E) or two (sub-bands E and D), of the five 30 MHz sub-band filters in order to restrict their operational capabilities via hardware limitations.

FIGS. 3B and 3C illustrate examples of alternative hybrid channel band plans for the example of the 3550-3700 MHz frequency band. Note that different tiered users may be assigned to one or more groups of sub-bands.

For example, in FIG. 3B, Tier 1 users are allowed to use all fifteen communication channels, while Tier 2 users are only allowed to use communication channels 6-15 and Tier 3 users only channels 1-12. Here, there are only four sub-bands. The sub-band filter that corresponds to sub-band A is 50 MHz wide, that corresponding to sub-band B is 40 MHz wide, that corresponding to sub-band C is 30 MHz wide, and that corresponding to sub-band D is 30 MHz wide.

FIG. 3C presents yet another example how the communication channels and the sub-bands may be distributed for use by the different tiers of users. In the example plan shown in FIG. 3C, the whole block of shared radio frequency spectrum is shown as being broken into 15 channels and four unequal sub-bands. In this implementation, sub-band A is 30 MHz wide, sub-band B is 60 MHz wide, sub-band C is 30 MHz wide, and sub-band D is 30 MHz wide. The communication channels available to the Tier 3 APs and EUDs may have, for example, only one (sub-band D) or two (sub-bands C and D), of the five sub-band filters in order to restrict their operational capabilities via hardware limitations.

Within a shared radio frequency spectrum system, the ASA controller 106 manages the use of channels in order to reduce or eliminate interference from nearby users. In our example, the ASA controller 106 therefore implements security mechanisms to: 1) identify users; 2) securely locate the users; and 3) securely allocate a communication channel. Besides performing the channel allocations secure control of the selection of the sub-band filter to reduce interference is also advantageous. The ASA controller 106 also securely controls the various transceivers' tuning mechanisms (to control the tuning controllers/synthesizers), in order to protect against rogue behavior on the part of Tier 3 users and devices (APs and EUDs). These three functions may also be secure against spoofing and identity theft.

First, the identity of the Tier 3 user making the request for spectrum allocation is securely known. The user identification protocols are encrypted, such that the ASA controller 106 cannot be spoofed by a Tier 3 device faking another identity.

Second, the Tier 3 AP reports its valid location for interference determination (keep out radius). That location report is also based upon an internal GPS within the AP, in order to accurately determine its own location. That location report to the ASA controller 106 is made by encrypting the report to again to avoid the possibility of spoofing the ASA controller 106 as far as location reporting is concerned.

Third, the Tier 3 AP and EUD devices are not able to autonomously tune their own RF tuning controllers (i.e. synthesizers) for channel tuning. Instead, the tuning or filter control word sent to the AP or EUD tuning or filter controller, respectively, is encrypted. The encryption method used to encrypt the tuning control word may be the same or different from the filter control word. Similarly, the encryption method used for encrypting the tuning and filter control words for an AP may be different from or the same as the encryption method used to encrypt the tuning and filter control word for the EUD. Depending on the complexity of the respective devices and the desired level of security, the ASA controller 106 can deploy various encryption methods for each of the AP tuning and filter control words. The Tier 3 AP or EUD typically waits a predetermined amount of time, such as tens of milliseconds up to a few (e.g., 5) seconds for the channel allocation and the subsequent receipt of the encrypted tuning word (containing the encrypted channel identifier) to be provided directly from the ASAS 105. This prevents the AP or EUD from autonomously selecting its own channel and prevents the device from autonomously tuning its own synthesizer under its own microprocessor's software or firmware control.

Assuming these first three mechanisms are secure, a fourth mechanism may also be added. The fourth mechanism is secure control of a single pole N throw (SPNT) multiplexer filter switch in order to allow the ASA controller to control the transceiver's sub-band of operation including selection of a front end sub-band filter. Besides further securing the mechanisms for allocating the channels, the additional feature achieved by controlling the choice of sub-band filter is that of interference management. By segregating groups of users or different use cases into different sub-bands, the ASA controller 106 is able to manage the coexistence of high power and low power use cases within the same area. Such a system is illustrated in FIG. 4.

Figure 4:
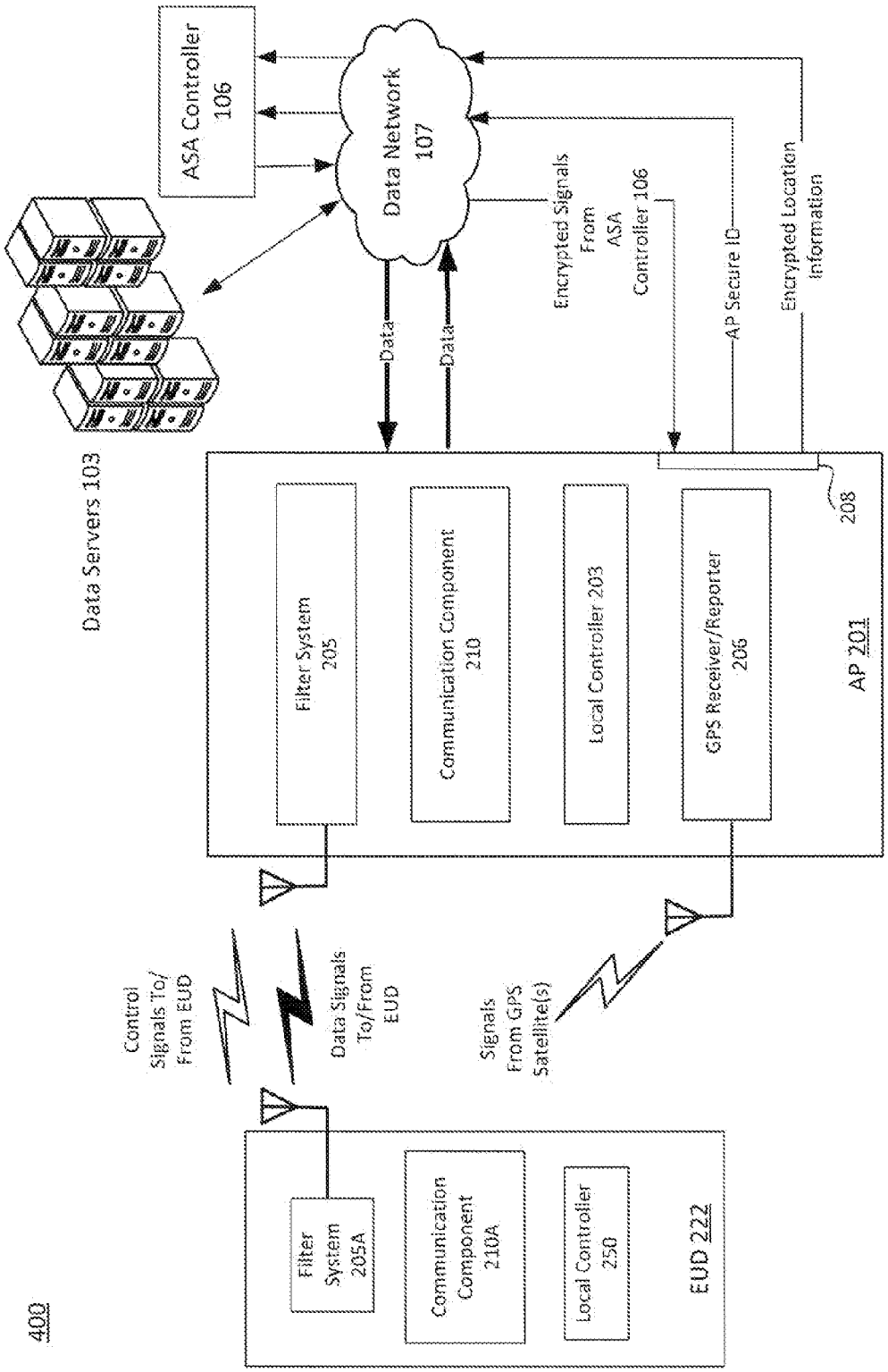
FIG. 4 is an example of a system that provides end user access to the shared frequency spectrum provided by the authorized shared access system.

FIG. 4 illustrates a system 400 including an external controller 106, a plurality of data servers 103, a data network 107, an access point (AP) 201 and an end user device (EUD) 222. The data servers 103 provide data (e.g., documents, web pages, spreadsheets, digital media content, such videos, images, audio, and the like) and other services (e.g., access to web portals, database access, digital media content providers (e.g., Netflix®, Verizon®, Cinemax®, Amazon®), and the like) to devices (e.g. AP 201 and EUD 222) and systems that access the data network 107. The data network 107 may be any form of data network, such as the Internet, an intranet, a campus-wide LAN, metropolitan LAN or other form of data network that allows an external controller, such as ASA controller 106, to communicate with the AP 201. Also, connected to data network 107 is the ASA controller 106, which is part of the ASAS 105, described above with respect to FIG. 1. The ASA controller 106 has access to the ASAS database 115 (of FIG. 1) and other resources of the ASAS 105 (such as other data servers 104 related to Tier 1 or Tier 2 users in this example). Using propagation modeling and spectrum sensing information from the ASAS database 115 and APs and EUDs controlled by the ASA controller 106, the ASA controller 106 may determine the extent, if any, keep-out zones and the transmit power settings (as described above) of the AP 201 and any connected EUD, such as EUD 222. The ASA controller 106 may determine based on information (e.g., propagation modeling information and/or spectrum sensing information for Tier 1/2/3 devices in the vicinity of the AP 201) obtained from the ASAS database 115 and/or the APs and EUDs connected to the ASA controller 106 the frequency band, or communication channel, that will be allocated to the requesting AP 201 from the candidate communication channels in the shared radio frequency spectrum.

The data from the data servers 103 and control signals from the external controller 106 may be provided through the data network 107 to the AP 201 via a wired (e.g. coaxial cable, fiber optic cable or otherwise hard-wired connection) connection or wirelessly, via a cellular connection, Wi-Fi, Bluetooth or some other wireless format in a frequency range outside the shared radio frequency spectrum. For example, control signals from the ASA controller 106 may be provided either wirelessly or via a wired connection to external connections 208 to the AP 201.

Data signals, shown by the heavier lines, are delivered from the data network via data connections (not shown) to the AP 201. The data from the data servers 103 may be provided through the data network 107 to the AP 201 via a wired (e.g. coaxial cable, fiber optic cable or otherwise hard-wired connection) or wirelessly, via a cellular connection, Wi-Fi, Bluetooth or some other wireless format in a frequency range outside the shared radio frequency spectrum.

The AP 201 may include a local controller 203, a global positioning system (GPS) receiver/reporter 206, a communication component 210 and a filter system 205. The functions of the respective components of the AP 201 will be discussed in more detail with reference to FIGS. 5A and 6A. The EUD 222 may include a local controller 250, a communication component 210A, which may be the same as or different from the communication component 210, and filter system 205A, which may be the same as or different from the filter component 205. The functions of the respective components of the EUD 222 will be discussed in more detail with reference to FIGS. 5B and 6B.

As shown in FIG. 4, the AP 201 provides information to the ASA controller 106 via the AP 201's connection to the data network 107. In particular, the AP 201 provides an AP secure identifier (ID) and encrypted location information to the ASA controller 106. The AP secure ID is an encrypted identifier (e.g., alphanumeric code or the like) that uniquely identifies the AP 201 from all other APs and EUDs that are serviced by the ASA controller 106, and ASAS 105. The encrypted location information is provided by a GPS receiver/reporter 206. The GPS receiver/reporter 206 receives GPS signals from GPS satellite(s), determines provides encrypted location information to the ASA controller 106. The encrypted location information, in order to remain secure, is not passed through any other component of the AP 201, such as the local controller 203, before being sent to the ASA controller 106. This prevents the location information from being compromised by a would-be unauthorized user.

In response to being provided with the AP secure ID and the encrypted location information, the ASA controller 106 allocates a communication channel to the AP 201 over which the AP 201 will communicate with a EUD device, such as EUD 222. The local controller 203 provides the data from the data servers to the EUD 222 by encoding the data for transmission in the allocated communication channel. The data encoding and transmission is performed by the communication component 210, and the data is transmitted via the filter system 205 and an air link to the EUD 222.

The EUD 222 includes similar components as the AP 201. Some of the respective components or systems may function in a very similar manner, while others may function somewhat differently. For example, each of EUD 222 and AP 201 may include at least a filter system 205 that functions similarly in both the AP 201 and the EUD 222. However, the communication component 210 of an AP 201 has both a transmitting component and a receiving component (i.e., a transceiver), while the EUD 222 includes a communication component 210A that may be configured, depending on the implementation, to have only a transmitting component, only a receiver component, or both, in the form of a transceiver component.

For example, a EUD 222 when configured as a sensing device (e.g., a water level detector, window alarm sensor, a glass break sensor or the like) may only receive control signals but be configured to transmit data signals, such as a level indication, an alarm signal or the like. In another example, a EUD 22 may be configured as a display device, such as a photo frame or an order status display in a retail store. In which case, the EUD 222 may only need a receiver to receive the data to be displayed and control data, such as an encrypted signal. In another example, the EUD 222 may be configured with a transceiver to couple a portable device (e.g., a laptop or tablet) to a data network to allow the portable device to interact with data servers, such as data servers 103. In this example, the EUD 222 receives control signals via wireless communications with the AP 201, but in other examples, the EUD 222 may be wired to an AP.

Each of EUD 222 and AP 201 has a local controller for controlling various functions of the respective EUD or AP. In either device (i.e., EUD 222 or AP 201), the local controller 203/250 is configured to receive encrypted signals either directly or indirectly (e.g., through another device or network) from the external controller 106. The details of the local controller 203/250 and processes that receive and respond to the encrypted signals will be discussed with reference to FIGS. 5A-6B.

Via the various components in the AP 201, the AP 201 communicates both control signals (e.g., the encrypted signals from the ASA controller 106) as well as data signals to (and from) the data network 107 from (and to) the EUD 222.

Figure 5A:
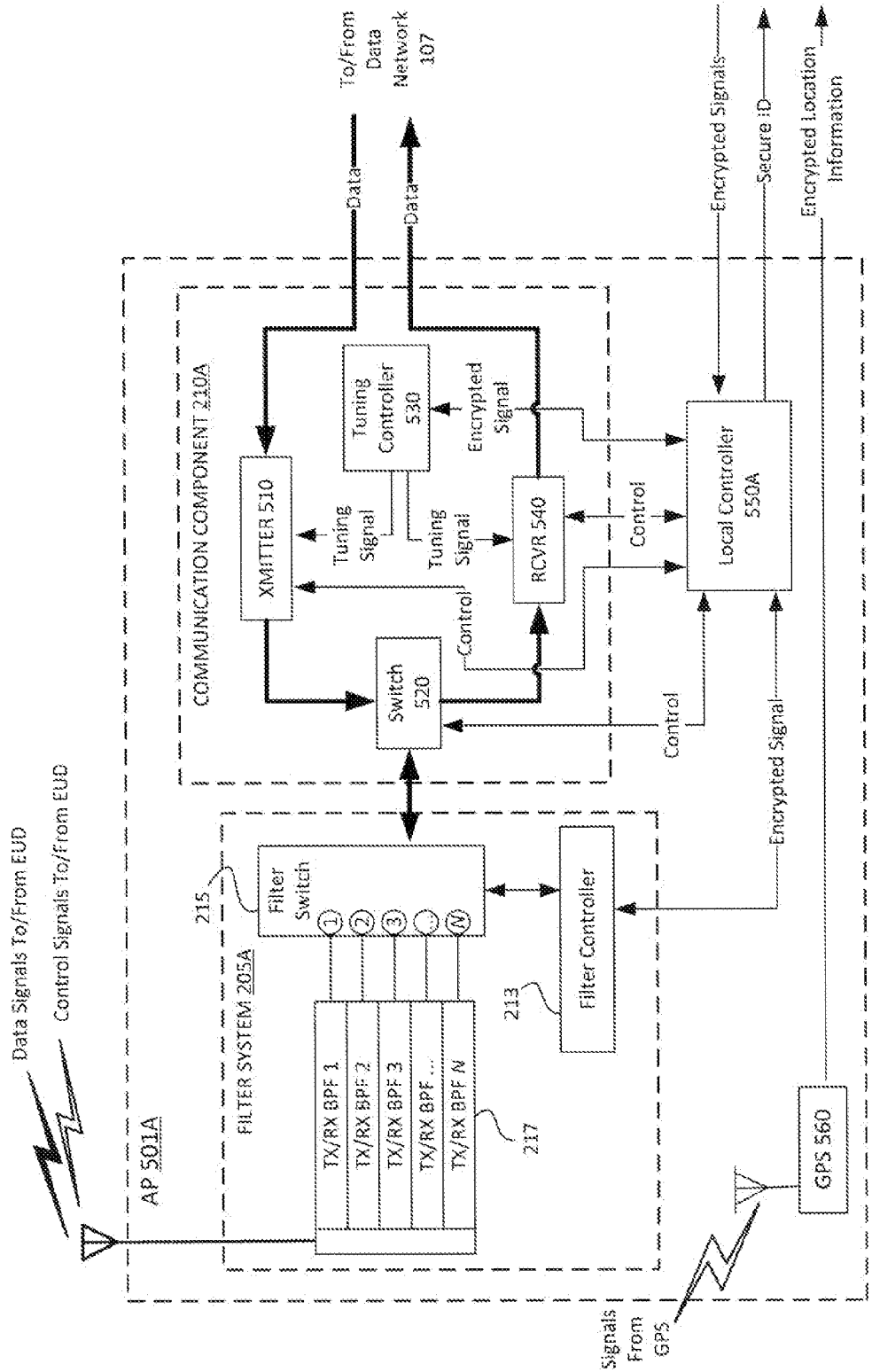
FIG. 5A is a high-level functional block diagram showing an example of an access point implemented in a time division duplex (TDD) configuration for providing access to shared radio frequency spectrum.

The operation of an access point, such as AP 201, will now be described in more detail with reference to FIG. 5A. FIG. 5A is a high-level functional block diagram showing an example of an access point implemented in a time division duplex (TDD) configuration for providing access to shared radio frequency spectrum as well as showing a network, controller and servers in communication with the access point.

The AP 501A is configured with data connections (shown as heavy dark lines labeled as "data") for receiving data from a data network and control connections (shown as thinner lines labeled with examples of control signals) for receiving control signals from an external controller, such as ASA controller 106. Similar to the AP 201, the AP 501A includes a communication component 210A, a filter system 205A, a local controller 550A and a GPS receiver/reporter 560.

In an example of the encrypted signal workflow at the AP 501, the local controller 550 provides the IP address of the ASA controller 106 to the tuning controller 530 processor, and an SSL/TLS tunnel is established between the tuning controller 530 processor and the ASA controller 106 via the local controller 550. The tuning controller 530 processor requests a communication channel allocation from the ASA controller 106. In response to the request, the ASA controller 106 delivers an encrypted signal containing an identifier of the allocated communication channel to the local controller 550A processor.

The AP 501A local controller 550A, for example, receives the encrypted signal indicating the allocated communication channel from among a plurality of communication channels in a shared access radio frequency spectrum. The AP 501A as part of the shared access system shares the plurality of channels in the shared access radio frequency spectrum with high power emitting systems, such as the Tier 1 users. The local controller 550A delivers to the communication component 210A, which is implemented as a TDD communication component. The TDD communication component 210A includes a tuning controller 530, a transmitter (XMITTER) 510, a switch 520 and a receiver (RCVR) 540. The encrypted signal is delivered by the local controller 550A to a tuning controller 530 configured to control tuning of the transmitter 510 and receiver 540 in the communication component 210A and to a filter controller 213 configured to control selection of a front end communication channel filter (i.e., one of TX/RX BPF 1-N) 217 in the filter system 205A.

The tuning controller 530 is configured to control the communication component 210A of the AP 501A to tune to the available communication channel based on the delivered encrypted signal. The receiver 540 includes a low noise amplifier (LNA) and subsequent stages, both of which are not shown, that allow the AP 501A to receive data signals and control signals from EUDs, such as EUD 222, connected to the AP 501A. The transmitter 510 includes a power amplifier (PA) and previous transmitter stages, both of which are not shown, that allow the AP 501A to transmit data signals and control signals from EUDs, such as EUD 222, connected to the AP 501A.

In some examples, the above tuning controller and filter controller functions may be combined in one controller. The one controller may be configured to provide the processing for securely controlling, based on the encrypted signal, the tuning of the devices within the communication component 210A and the selection of a front end communication channel filter 217 in the filter system 205A. The one controller, like the tuning controller and the filter controller, may be configured to be tamperproof and maintain the security of the encrypted signal and the decryption algorithms.

Figure 5B:
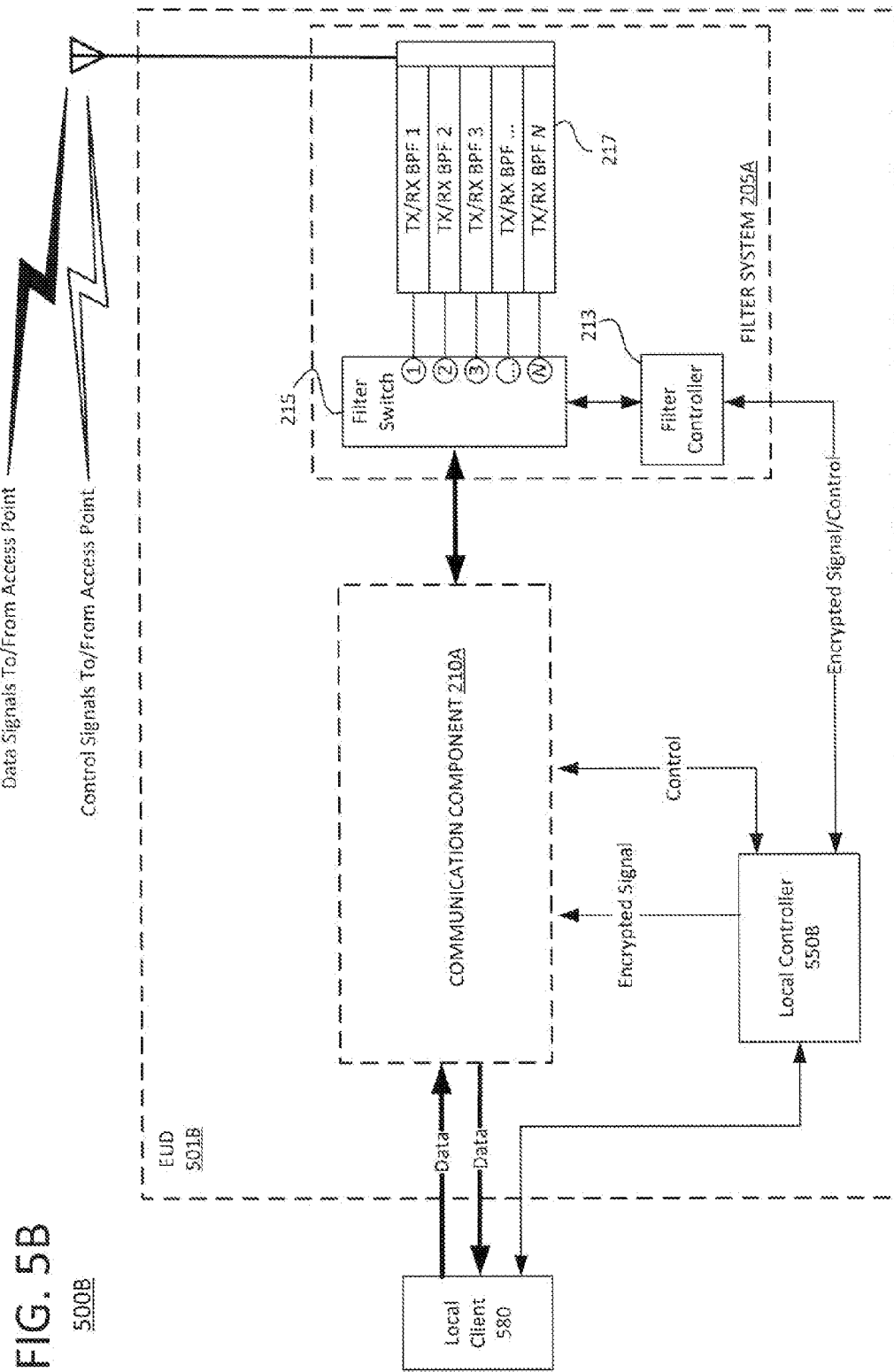
FIG. 5B is a high-level functional block diagram of an example of an end user device implemented in a time division duplex (TDD) configuration for providing access to shared radio frequency spectrum.
Figure 6A:
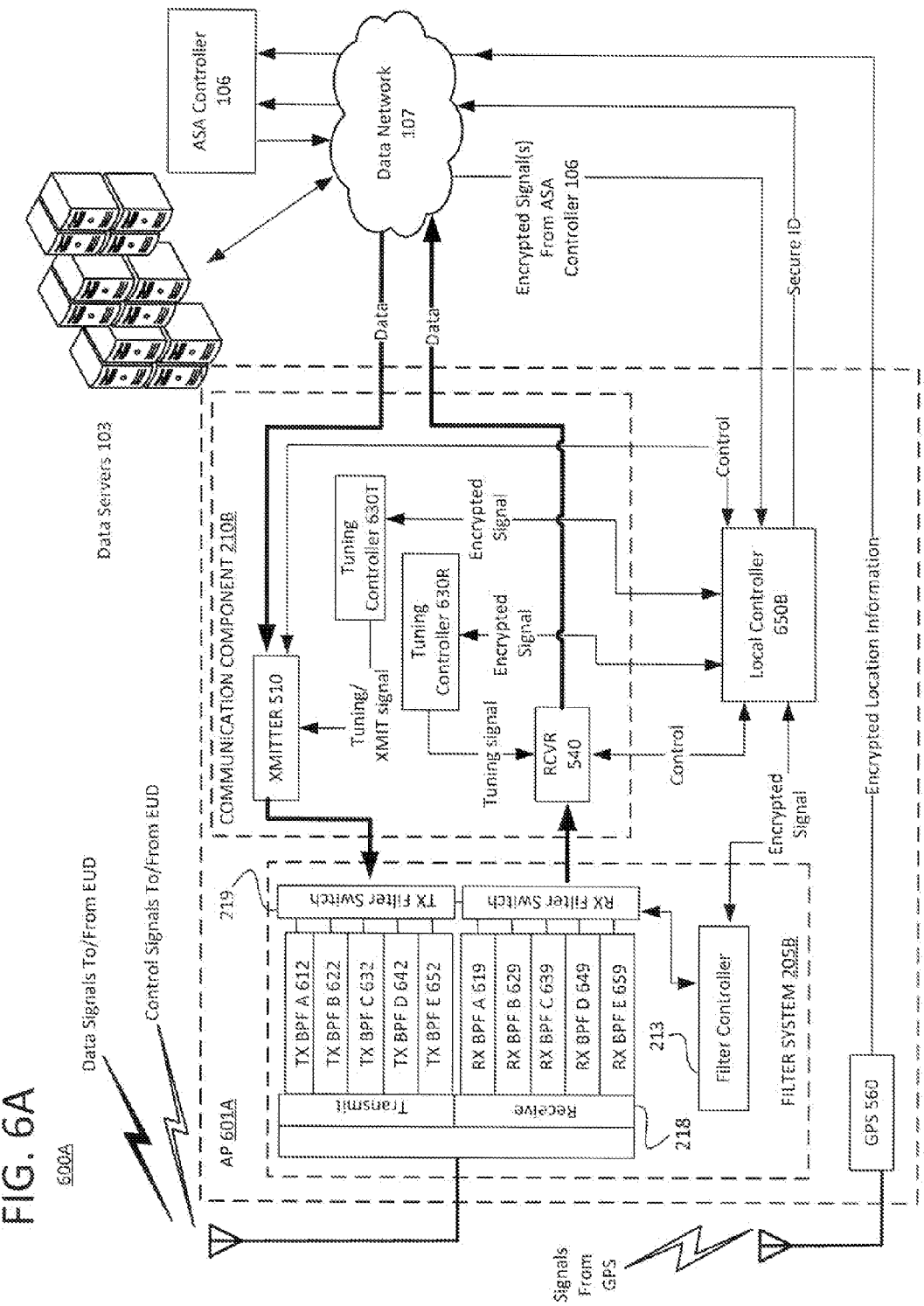
FIG. 6A is a high-level functional block diagram showing an example of an access point implemented in a frequency division duplex (FDD) for providing access to shared radio frequency spectrum as well as showing a network, controller and servers in communication with the access point.
Figure 6B:
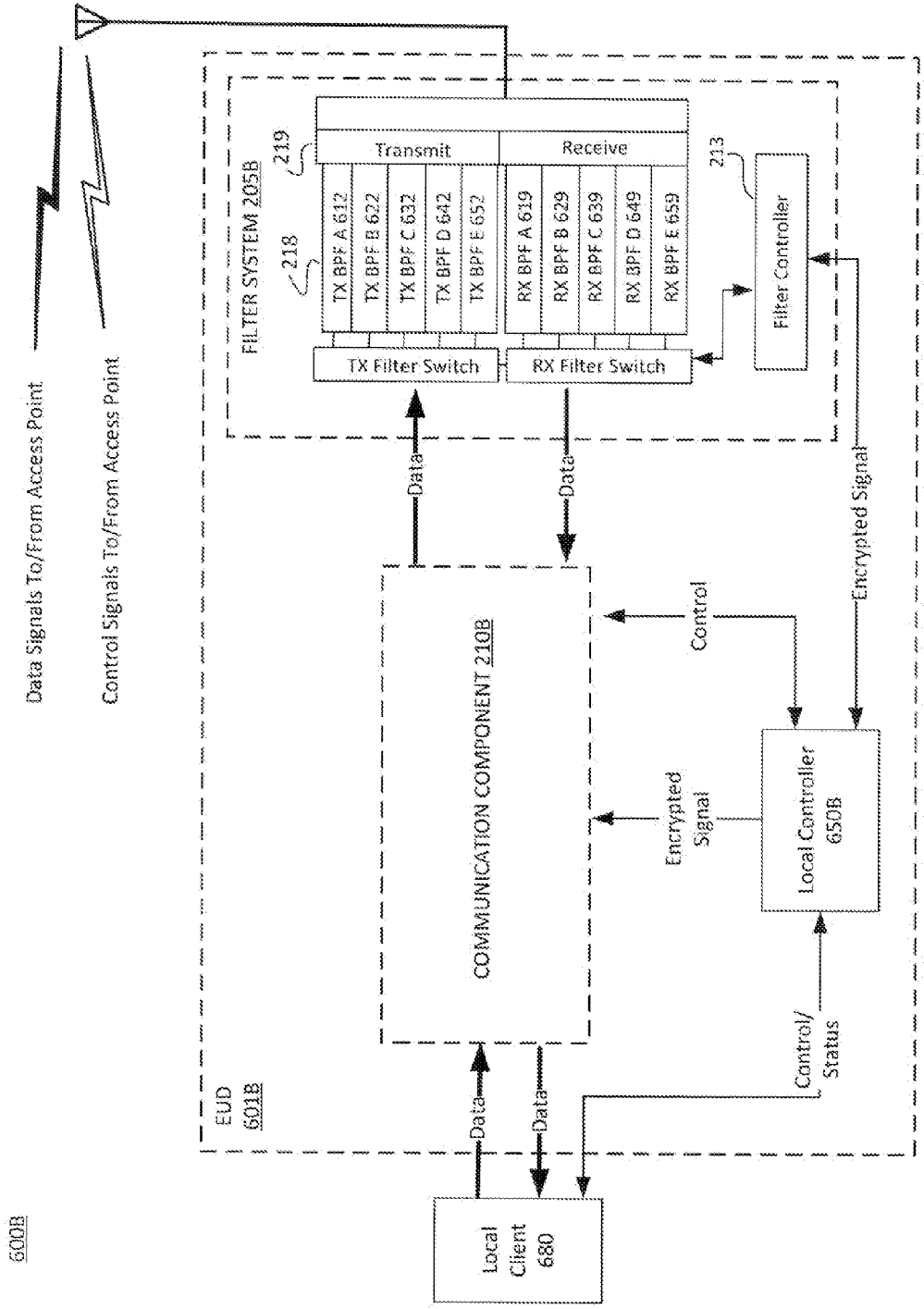
FIG. 6B is a high-level functional block diagram of an example of an end user device implemented in a frequency division duplex (FDD) configuration for providing access to shared radio frequency spectrum.

The two most commonly used communication protocol implementations for access points, base stations and other devices are time division duplexing (TDD) and frequency division duplexing (FDD). Generally, in TDD, the same communication channel is divided into time slots and the device can either only transmit or receive in one of the time slots. Communication using TDD may use more complex management and proper synchronization between devices when in the transmit and receive modes in order to avoid interference from other devices. In contrast, in FDD, typically, the uplink communications frequency and the downlink communications frequency are offset from one another by a predetermined frequency offset (e.g. 100 kHz), which allows the device to transmit and receive at the same time. An advantage of FDD over TDD is that the device configured to perform FDD communication can transmit and receive data in parallel, instead of having to wait, in a TDD configuration, to complete transmitting to begin receiving and vice versa (i.e., in a more serial fashion). The communication component 210A may be configured to perform either TDD communications or FDD communications. FIGS. 5A and 5B show examples of a TDD configured AP and EUD, respectively, while FIGS. 6A and 6B show examples of a FDD configured AP and EUD, respectively. In TDD systems, a duplexing (also known as diplexing) switch, such as switch 520 in FIG. 5A, is used to switch between transmit and receive functions. Thus, any one of the band pass filters (BPF) may be used to support bidirectional communications, where these BPF filters are used to select the appropriate sub-band. For example, switch position 2 may be used to select TX/RX BPF 2, which may correspond to a specific sub-band, such as, for example, sub-band B of FIG. 3B. In FDD systems, a multiplexing (or duplexing or diplexing) filter may be used to perform the duplexing (or diplexing) function to serve the simultaneous uplink and downlink channels. As shown in FIG. 6A, the AP front end RF filtering may be partitioned into ten different portions, where five sub-bands correspond to (downlink) AP transmitter portions A, B, C, D and E (612, 622, 632, 642, and 652), and another five portions correspond to the associated (uplink) AP receiver portions A, B, C, D and E (619, 629, 639, 649, and 659). The filtering performs the transmit/receive duplex (diplex) function. Subsequently, two different switches are used to select the appropriate pair of sub-bands. Again, corresponding to the Band Plan of FIG. 3B, an FDD AP would select TX BPF 622 (for downlink) along with RX BPF 629 (for uplink) as an downlink/uplink paired set of sub-bands.

For example, in FIG. 5A, the AP 501A, in an example of time division duplex (TDD) communications, simply passes data, via the transmission path that includes the transmitter 510, the switch 520, and the filter system 205A, and an airlink (not shown), to a EUD that has requested the data. The AP 501A is also configured, in a TDD implementation, to receive data from EUD user devices on the same channel that the AP 501A uses to transmit. The AP 501A receive channel includes the airlink to the AP device antenna, which is coupled to the filter system 205A, the switch 520 (configured to a receive state), receiver 540, and the AP data output connections to the data network and data servers 103. In either the TDD or FDD configuration, the encrypted signal is received at the AP 501A by the local controller 550A, but is passed uninspected to the tuning controller 530.

In response to receiving the encrypted signal, the tuning controller 530 processor processes the encrypted signal by obtaining (e.g., parsing or otherwise extracting) the communication channel information from the respective data fields (as described below) of the encrypted signal. The tuning controller 530 processor may or may not return an acknowledgement message to the ASA controller 106. The ASA controller 106 either in response to the acknowledgement message or, after a certain time period, may signal to the local controller 550A that the session is terminated.

The encrypted signal is transmitted via a communication connection, such as a connection to the Internet that supports Internet Protocol based communications, from the ASA controller 106 to an input of the Tier 3 AP device 501A and to the AP tuning controller 530. The AP tuning controller 530 is configured to be the only component in the communication component 210A of the AP 501A that is capable of decrypting the encrypted signal to obtain a tuning word corresponding to the allocated communication channel. The AP tuning controller 530 is configured with a decryption algorithm that is inaccessible by other components with in the AP 501A or to devices external to the AP 501A. In other words, the encrypted signal is delivered to the tuning controller 530 in encrypted form, and at least in one embodiment, the encrypted signal has not been and cannot be decrypted by any intermediary device between the tuning controller 530 of the AP 501 and the ASA controller 106.

As an additional security measure, by allowing only the tuning controller 530 to decrypt the encrypted signal and obtain the tuning word from the encrypted signal, the system 500A prevents other components, such as local controller 550, of the AP 501A and subsequently the end user device (not shown) from autonomously selecting their own transmit and/or receive communication channels and prevents the AP 501 local controller 550 microprocessor software or firmware control from autonomously instructing the tuning controller

530 to tune to transmit and receive communication channels outside those allocated by the ASA controller 106.

Once the tuning controller 530 decrypts the encrypted signal and obtains the tuning word, the tuning controller 530 generates a tuning signal from the tuning word and provides the tuning signal to the transmitter 510 and the receiver 540. The tuning controller 530 may generate the tuning signal by using a look up table to find a communication channel that corresponds to the decrypted tuning word. Since the AP 501A is implemented as a TDD device, the transmitter 510 and the receiver 540 are tuned to the same communication channel (e.g., channel 1). Switching between the transmit and receive mode is accomplished by selecting the communication signal path via the switch 520 that is controlled by the local controller 550A. For example, when the AP 501A is transmitting, the switch 520 is configured, via a control signal from the local controller 550A, to connect the transmitter 510 to the filter system 205A. Conversely, when the AP 501A is receiving, the switch 520 is configured, via a control signal from the local controller 550A, to connect the receiver 540 to the filter system 205A. The local controller 550A also controls the receiver 540 and transmitter 510.

The filter system 205A is the filtering front end of the AP 501A communication component 210A that includes an antenna and front end communication channel filters 217 coupled to an N-way multiplexer filter selection device (i.e., switch) 215. The front end communication channel filters 217 are a collection of a number of RF band pass filters (e.g., 1-N) in order to segment the whole RF band (e.g., 3550-3700 MHz) into a number of sub-bands (e.g., A-N). For example, the n-way multiplexer switch is shown as a single pole N throw (SPNT) RF filter switch 215 allows the selection of one of the sub-bands for operation. The SPNT filter switch 215 is under the control of the filter controller 213.

Note that both the APs and the EUD devices may be restricted only by software, firmware and channel allocation to a subset of communication channels and a corresponding set of switch positions, for filter switch 215, that correspond to a subset of sub-bands or the filter system 205A may not include all of the available communication sub-band filters. In an example, the shared radio frequency spectrum may be broken into 15 channels and five sub-bands (e.g., A-E) as shown in FIG. 2. While in other examples, the GAA APs and EUD devices may have only one, two, three or four of the 30 MHz sub-band filters in order to restrict their operational range via hardware limitations. Thus, the N number of filters may vary by device type, Tier type (e.g., 1, 2 or 3), and/or user class (military incumbent versus civilian).

In some implementations, a particular filter, such as AP TX/RX BPF 1 in FIG. 5A, may be configured to allow several of the defined sub-bands to pass (and block signals from other bands), such as sub-bands A and B and C all together, (corresponding to channels 1-9 as shown in FIG. 2 for example), thus allowing fewer sub-band filters and switching ports, but allowing less granularity in front end selection, and thus affording less segmented protection.

In other implementations, the front end sub-band filters 217 may be configured to allow only a single defined sub-band to pass, thus using five separate BPFs and five switch positions to support all five sub-bands shown in FIG. 3B (A, B, C, D and E). In operation, a single switch position, such as position 3 to select BPF 3 (217) may be used to select sub-band C, corresponding to channels 10, 11 and 12 of FIG. 3B.

In other implementations, the front end sub-band filters 217 may be configured very narrowly to correspond to an individual communications channel (1 through 15) thus using a large number (fifteen) of supporting sub-band BPF filters and corresponding switch positions. This allows very fine control, but uses an increased number of sub-band filters and corresponding switch positions, and also disallowing aggregating adjacent 10 MHz channels to form wider channel allocations.

In addition to delivering the encrypted signal to the tuning controller 530, the local controller 550A delivers the encrypted signal to the filter controller 213 in the filter system 205A. Similar to the tuning controller 530, the filter controller 213 is also configured to be the only other component in the filter system 205A of the AP 501A that is capable of decrypting the encrypted signal to obtain a filter selection word corresponding to the allocated communication channel. In other words, the encrypted signal is delivered to both the tuning controller 530 and the filter controller 213 in encrypted form, and at least in one embodiment, the encrypted signal has not been and cannot be decrypted by any intermediary device, such as local controller 550A, between the filter controller 213 of the AP 501A and the ASA controller 106.

In an implementation, the filter controller 213 front end communication filter selection is kept under a purely hardware control mechanism, not under the control of local software or firmware resident in the local controller 550 microprocessor, to prevent the software or firmware from, for example, potentially being re-flashed, with a new, unauthorized software or firmware programming code that would allow the AP or EUD device to autonomously select a different sub-band filter not under the control of the ASA controller 106. This mitigates the threat of the AP 501A from being "hacked" and prevents the resulting potentially interfering use of the AP 501A or EUD device (not shown). In other words, the filter controller 213, in this example, is implemented in such a manner to be tamperproof. The tuning controller 530 may similarly be implemented to be tamperproof to prevent unauthorized autonomous tuning of the local synthesizer 530.

In an example, the filter system 205A including the filter controller 213 is implemented, in some examples, as a dedicated secure ASIC and includes a processor (not shown) and a memory (not shown). The filter controller 213 has control signal connections to the local controller 550A for receiving the encrypted signal and to the filter switch 215. To protect from possible hacking, the filter controller 213 is implemented in a secure configuration in which the ASIC hardware or microprocessor firmware (or software stored in memory) cannot be re-written (i.e. re-flashed) to alter the behavior of the filter controller 213 processor. In an example, only one type of filter controller 213 is used in all access point devices, including AP 501A, and includes program instructions for a filter controller 213 ASIC or processor to execute a filter selection encryption/decryption method that is used so that the ASA controller 106 need only apply one set of coded (encryption/decryption) methods to all intended individual Tier 3 user APs. The interface between the filter controller 213 and the local controller 550A may be via an inter-integrated circuit (I2C), a universal asynchronous receiver/transmitter (UART), and universal serial bus (USB), or the like.

Alternatively, the entire filter system 205A (i.e., the filter controller 213, the filter switch 219, and the communication channel band pass filters 218) can be implemented as an ASIC. The ASIC may include a standardized serial or parallel data interface in order to accept the encrypted filter control token. The ASIC includes a hardware implementation of the filter controller 213 that allows decrypting and decoding of the encrypted filter control signal or token. The encrypted filter control token will be described in more detail with reference to FIG. 7.

In this example, the filter controller 213 processor executes program instructions retrieved from a memory accessible only by the filter controller 213 processor to decrypt the encrypted, secure control word provided by the local controller 550. Using the decrypted secure control word, the filter controller 213 selects the appropriate corresponding sub-band filter indicated by the decrypted filter selection word, which was provided as an encrypted signal by the ASA controller 106.

In a more detailed explanation of the operation, as shown in FIG. 5A, the filter controller 213 receives the encrypted filter control signal from the local controller 550A, and begins decoding the encrypted filter control token. The filter controller 213 parses the encrypted signal to identify an encrypted filter control word. The filter control word may be in a data field with the tuning control word used by the communication component 210A (specifically, the tuning controller 530) to tune the transmitter and/or the receiver 540. The filter controller 213 decrypts the encrypted filter control word to determine a filter selection word. Based on the determined filter selection word, the filter controller 213 outputs a signal to the filter switch 215 causing the filter switch 215 to select a front end sub-band band pass filter from among a plurality of front end sub-band filters. For example, the filter switch 215 selects the TX/RX BPF 1 as the filter to be used based on the decrypted filter control word. The filter control word indicates a filter that allows the communication component 210 to transmit and receive data and/or control signals transmitted within sub-band A and via the communication channel indicated by the tuning control word. In response to selection of a sub-band filter, the filter switch 215 by selecting the sub-band filter establishes a communication path for signals in the available sub-band to be transmitted and/or received between the communication component 210A and an EUD via an airlink and the antenna of the AP 501A.

The communication channel filters 217 are configured to minimize effects of the high power emitting systems operating on one or more other communication channels from among the plurality of channels. Although shown including band pass filters 1-N in the set of front end communication channel filters 217, the number of band pass filters may be any number of band pass filters, in which case, the filter switch 215 can have a number of throws corresponding to the number of sub-band band pass filters within the filter bank. For example, the filter switch 215 may be a RF Single Pole Two Throw (SP2T or SPDT) switch that serves as a duplexer (i.e., a diplexer) switch to select from a pair of band pass sub-band filters.

By using a multiplexer (e.g., filter switch 215) with a communication channel filter 217 as the front end filter system 205A before the communication component including the TDD transceiver system, as shown in FIG. 5A, the front end low noise amplifier (LNA) (not shown) of the receiver 540 may be protected from interference from other operational communication channels outside the sub-band filter that are being used. Thus, for example, if a high power radar is operational in sub-band A using any of channels 1, 2 or 3, as shown in FIG. 3B, it may not be possible for the AP 501A to receive a low level signal on any other channel in the A sub-band. In other words, if the radar is emitting in channel 2, any devices attempting to transmit in either channel 1 or 3 may be unable to because of interference from the radar emissions. But if a single pole multiple throw (i.e. SPNT) filter switch 215 is used to select another sub-band filter (e.g. TX/RX BPF 2 or 3, say corresponding to sub-band B or C), then the receiver 540 LNA would be protected from the high power undesired 'blocking' signal of the radar in sub-band A.

Based upon the communication channel allocation as made by the ASA controller 106, the AP 501A (as well as any other local BTS, local access point or local EU device) can control, via the device's tuning controller, not only its own synthesizer (s) tuning in order to select the proper channel for transmission or reception operation, but it may also locally control its own multiplexing, front end filter switch 215 in order to select the appropriate sub-band filter (i.e. frequency sub-band or sub-block) Therefore, the filter controller 213 in the AP 501A (which may also be a BTS) can protect the receiver 540 front end from overload and other sub-band interference by selecting the narrower sub-band filter based on the filter control word (described above). Thus, if high power users are within other sub-bands, not all sub-bands are precluded from low power use. This may drastically reduce or eliminate the size of the Keep Out restriction zones that are created by high power radar use, where the other lower powered Tiers (different use cases) cannot operate due to front end overload if they do not have sub-band filtering capabilities.

For example, it may be desirable that the communication channel filter choice (SPAT switching control) (e.g., TX/RX BPF 1, TX/RX BPF 3, or TX/RX BPF N) be kept under a purely hardware control mechanism, and not under the control of software or firmware resident in a local microprocessor because the software or firmware can be re-flashed, with a new, unauthorized software or firmware programming code allowing the AP 501A to control this filter switch 215 autonomously. This is the threat of the device being 'hacked.' By externally controlling the filter switch 215 selection of the sub-band filter setting, the local controller 550A may neither transmit nor receive on communication channels outside the assigned sub-band. This may be important to protect certain classes of users (e.g., military radars) from being readily identified as to their mode of operation, frequency of operation, power level, location or the like. In other words, the GAA EUDs or APs would be precluded from unauthorized listening (spectrum sensing) for such radars because the external ASA controller would select the authorized sub-band.

As mentioned above, the filter system 205A operates in response to an encrypted signal received from the ASA controller 106. It may be helpful at this point to briefly discuss a format of an encrypted signal, or token. An encrypted signal may include a secure socket layer (SSL) or transport layer security (TLS) header and an encrypted token. The SSL/TLS header may include an IP header, SSL/TLS parameters and an optional hypertext transport protocol (HTTP) field. The SSL/TLS parameters provide for encryption of the data while in transmit from the ASA 106 controller to the AP 201 and/or a EUD, and provide a satisfactory level of insurance of data integrity and confidentiality. Using the SSL/TLS parameters, the AP 501A or EUD 501B processor may perform mandatory server authentication using public key infrastructure (PKI) protocols and insure that the device delivering the encrypted signal has a properly built certificate chain, such as an X509v3 certificate, to validate. The key generation and exchange may be performed according to known methods that provide a suitable level of security and data integrity to prevent unauthorized decryption of the encrypted signal. Of course, non-PKI methods may be used.

Any application data protocol (e.g., JASON or Binary file) may be used when transmitting the encrypted signal; hypertext transfer protocol (HTTP) is often preferred due to the prevalence of the web services infrastructure. As for the encrypted token portion, the encryption used may be a symmetric encryption such as advanced encryption standard (AES) or triple data encryption standard (3DES). The encrypted token portion may include a number of data fields, such as a metadata field, a frequency field, a random number and signature field and a message authentication code (MAC) field. Each field may include encrypted data relevant to tuning the AP tuning controller 530 to a suitable frequency. Each field may include encrypted data relevant to the filter controller 213 control of (FIG. 5A) selection of a suitable sub-band by the AP front end sub-band filter switch 215. For example, the metadata field may include information such as an encrypted signal expiration date, a time and date and the relevant client and server identifiers (e.g., session identifiers, geo-location data and the like). The frequency field may include the frequency to which the synthesizer (and accordingly the transmitter and receiver) are to be tuned. The sub-band field may include the sub-band designation to which the switch throws of filter switch 215 are to be selected. The random number and signature field may include a random number generated from a secret encryption key (introduce entropy) that may be signed with a private key for authentication. The MAC field may be used for confirming the encrypted signal payload by using, for example, a hash-based message authentication algorithm or other suitable algorithm.

Returning to the discussion of the filter system 205A, a greater or fewer number of sub-band band pass filters may be included in the set of sub-band filters 217. In an example, the set of sub-band filters 217 may include a subset of all the sub-band filters that may cover the shared radio frequency spectrum. The subset of sub-band filters may include one or more, but fewer than all of the communication channels. Or, in other examples, the subset of sub-band filters may actually include all of the sub-band filters.

For example, only two of the defined sub-band filters may be incorporated into the set of sub-band filters 217. In this case, referring to FIG. 3C, the sub-bands C and D encompass the top six communications channels 10 through 15 that are the only sub-bands available for use by a Tier 3 GAA device. Here, a Tier 3 GAA device, such as AP 501A, may have a filter system that only passes signals in the C and D sub-bands, but still allows tuning access to multiple communication channels (i.e. 10-15) within the C and D sub-bands in order to avoid low power interference within any one sub-band. These two sub-band filters, C and D, allow segmentation of different Tiers of users or different groups of users within the respective sub-band based upon the switching between the sub-bands (e.g., C and D) and the number of sub-band channel filters (e.g., 10-15) included within the set of front end filters (filter bank) 217.

In some examples, in order to allow maximum communication channel allocation flexibility, it may be assumed that all Tier 2 and Tier 3 devices (BTS transceivers, EUD device transceivers, Tier 3 GAA Access Point transceivers and Tier 3 GAA EUD device transceivers) can tune anywhere within the entire RF block (the entire frequency allocation of the shared radio frequency spectrum). This assumption gives the ASA controller 106 maximum flexibility to allocate the available communication channels both to avoid interference between different users in the same area, and to provide the maximum available spectrum for all the users on a shared basis.

The simplest transceiver front end design for a TDD system (or an FDD system) is to have one single TDD RF band pass filter that covers the entire communication channel allocation. (Or, for FDD applications, two single FDD filters— one for reception and one for transmission that cover the entire uplink and downlink separated allocations). In some implementations, the transceiver front end may be vulnerable to interference, especially in a near-far case of different use cases (different types of systems at radically different power levels and with different antenna gains). High power systems often create very large 'exclusion' zones where other, lower powered systems may not operate for fear of interference, front end overload (blocking, or in the most extreme case, 'burn-out'). Front end 'burn-out' occurs when the high power system and its associated high gain antenna creates such a strong far field energy level in proximity of the low power system, that the LNA and front end stages of the receiver system are permanently damaged (desensitized) or even destroyed. At lowered receive power levels (further away from the higher powered users), the victim receiver experiences the 'blocking' effect, where the non-linear behavior of the overloaded LNA or mixer stage desensitizes the whole receiver chain to the reception of the low level desired channel across the whole band or sub-band. This may occur even on channels that are not co-channel or adjacent channel to the source of interference. By incorporating a sub-banding multiplexing filter, the whole block may be segmented into multiple sub-bands, where the filters provide significant additional isolation between the sub-bands.

Similar features may be incorporated into other devices, such as an end user device which is described in more detail with reference to FIG. 5B. FIG. 5B is a high-level functional block diagram of an example of an end user device implemented in a time division duplex (TDD) configuration for providing access to shared radio frequency spectrum.

It is also envisioned that the functions of the tuning controller 530 and the filter controller 213 may be combined in at least one secure, tamperproof controller to provide the secure processing of the encrypted signal received from the local controller 550A. Such a controller may be configured to provide both the tuning control and the filter selection control in a secure manner as explained above. For example, the one controller may be implemented as an ASIC as described above.

System 500B of FIG. 5B includes a EUD 501B and client device 580 in which the EUD 501B provides a connection to the data network 107 for the client device 580. In other words, the EUD 501B is used as a "slave" transceiver for the AP 501A to exchange data with the EUD 501B. The EUD 501B includes a local controller 550B, a filter system 205A, and a communication component 210A. Unlike the AP 501A, the EUD 501B does not include a GPS receiver/reporter 560 and the local controller 550B may or may not be configured differently than local controller 550A. Instead of providing data communication services to an EUD as does the communication component 210A of the AP 501A, the communication component 210A of the EUD 501B provides data communication services to a client device 580, such as a laptop, a personal computer or a tablet device. Other than the end user of the transmitted data, the communication components 210A in both the AP 501A and the EUD 501B may be the same. Thus, a detailed description of the communication component 210A of the EUD 501B is not provided as the description would be duplicative of that provided with respect to the communication component 210A of the AP 501A.

Another difference between the AP 501A and the EUD 501B is that the client device 580 and the EUD 501B have no direct connection to a data network 107. Instead, the EUD 501B wirelessly obtains access to data network 107 (i.e., Internet or intranet) via the AP 501A, which is similar to using a Wi-Fi 802.11 access point. For example, the EUD 501B may be configured as a dongle that connects to a universal serial bus (USB) port of a laptop device to wirelessly connect to via an AP, such as AP 501A, to obtain wireless Internet access. Since the EUD 501B has no direct internet connectivity, the control mechanism signals (e.g., encrypted signal and control signals) are received via an over-the air interface.

In contrast to a EUD, an AP typically always knows its channel and sub-band allocation because it is connected to ASA controller through the IP network, and not via the shared air interface. At start up, the EUD 501B connects in some manner with an AP, such as AP 501A. During operation, the EUD 501B tracks the allocation changes, as the AP retransmits its channel and sub-band allocation to the served EUDs so the served EUD is able to track changes in the channel and sub-band allocation. However, when a EUD is non-operational (i.e., off or asleep (as in a low power mode or the like)) for a time, or all allocations are taken away by the ASA controller 106 for a time, then the EUD may wake up not knowing the channel and sub-band currently allocated for communication with an AP. In one example, the EUD may autonomously scan to reacquire an AP that was associated with the EUD previously. Alternatively, the EUD may synchronize to a clock, and at a known future time or at predetermined time intervals, may attempt to tune to a future channel and sub-band allocation that were pre-sent by the AP and stored locally at the EUD. In yet another alternative, a channel may be kept in reserve as the fallback channel for an initial search for EUDs that have lost connectivity to an AP. In another example, the EUD 501B may attempt to establish a connection via the last communication channel to which the EUD 501B was tuned. Of course, other methods of establishing initial contact with an AP are known and may be used.

However, the EUD 501B in order to continue to communicate with the AP 501A eventually has to tune to a communication channel allocated by the ASA controller 106. As a result, the encrypted signal (which is a form of control signal) is provided to the AP 501A by the ASA controller 106, as explained above with reference to FIG. 5A, and is relayed by the AP 501A via a wireless link to the EUD 501B. The EUD 501B receiver 540 receives the encrypted signal and conveys it to the local controller which relays the token directly to the filter controller 213 of the filter switch 215. There, the encrypted signal token is decoded by the filter controller 213 as described above in the discussion of FIG. 5A to provide a filter selection word. Using the filter selection word, the filter controller 213 outputs a signal to the filter switch 215 causing the filter switch 215 to select a front end sub-band filter from among a plurality of front end sub-band filters. Once the front end sub-band filter is selected, the EUD 501B is able to communication with the AP 501A via the allocated communication channel.

As mentioned above, different signaling formats are available, such as TDD and FDD. While FIGS. 5A and 5B illustrated examples of TDD implementations of an AP and EUD, respectively, FIGS. 6A and 6B illustrate examples of FDD implementations of an AP and a EUD.

The system 600A includes an FDD-configured AP 601A that interacts with the same external system components as AP 501A, which are the data servers 103, ASA controller 106 and network 107. As for the components of AP 601A, the GPS receiver/reporter 560, the transmitter 510 and the receiver 540 are configured the same in AP 501B as the same components in the AP 501A of FIG. 5A. However, instead of a single tuning controller 530, which provides a single tuning signal to both the transmitter 510 and receiver 540 as in FIGS. 5A and 5B, the FDD-configured AP 601A may use a pair of synthesizers 630T and 630R.

In FDD systems, the transmitter 510 and receiver 540 functions may operate simultaneously or substantially simultaneously, and the duplexer or diplexer switch (e.g., 520 in FIG. 5A) is replaced by a duplexer filter system 205B (also known as a diplexer filter). For example, in FDD systems each defined sub-band has both a defined uplink sub-band (band of frequencies or communication channels) and a corresponding defined downlink sub-band (band of frequencies or communication channels) and thus each sub-band has two associated sub-band filters (one for uplink and one for downlink). The duplexer filter system 205B is connected to the antenna, and has a number of two branched filters (or pairs of filters), one branch for supporting by a band pass filter (BPF) tuned to the transmitter band (i.e., TX BPF 612), and the second branch supported by a BPF tuned to the receiver band (i.e., RX BPF 619). The duplexer filter 516 is configured to allow the receiver to receive signals on the first communication (i.e., frequency) channel and to transmit signals on the second (paired) frequency channels. The encrypted signal in a FDD implementation may include at least a pair of tuning words (e.g., one for transmitter tuning and another for receiver tuning) are provided by the ASA controller 106. Each of the individual tuning words in the pair of tuning words is different from the other tuning word in the pair, and will not be decrypted to produce the same frequency channel for tuning of the transmitter 510 and receiver 540.

In other words, different communication channels for transmitting and receiving are allocated to the AP 601A to be used by the pair of synthesizers 530T and 530R (if the uplink and downlink are uncoordinated), e.g., a fixed relationship (duplex spacing) between the uplink and downlink channel frequencies is employed, such that one indication indicates a pair of channel frequencies: one for uplink, such as A1, and one for downlink, such as A2, that are a fixed separation in frequency apart. In the case of an FDD implementation, the encrypted signal includes a tuning word that indicates a pair of communication channel frequencies (e.g., two communication channel) assignments that are parsed by a filter controller 213. For example, a communication component, such as synthesizer 530T, tunes to a first channel in a frequency sub-band in the available channel for uplink communication and, in the same communication component, synthesizer 530R, tunes to a second channel in the frequency sub-band in the available channel for downlink communication.

Since a pair of communication channels may be used by the FDD-configured communication component 210B, the configuration of the filter system 205B is different from the filter system 205A used with a TDD-configured AP or EUD device. The FDD-configured filter system 205B includes a filter controller 213, a filter switch 219 and a filter system 218. The filter controller 213 performs substantially the same functions as the TDD-configured filter controller 213 of FIGS. 5A and 5B above. As mentioned above with respect to the filter controller 213, the filter controller 213 receives via the local controller 650B an encrypted signal sent from the ASA controller 106.

Upon receipt of the encrypted signal, the filter controller 2213 decrypts the encrypted signal to obtain the filter selection word. Upon determining the filter selection word, the filter controller 213 passes a signal to the filter switch 219 that places the filter switch in a state that establishes a communication path through the band pass filter pair that passes the signals in the respective different communication channels to which the transmitter and receiver are tuned.

The filter switch 219 is different from the filter switch 215 of FIG. 5A. Because the communication component 210B is configured as an FDD device, the filter switch 219 when actuated makes two communication paths, one for the transmitter signals and another communication path for the receiver signals. For example, instead of a single pole N throw switch as used in filter system 205A of FIG. 5A, the filter switch 219 is a double pole N throw switch, or may be two separate SPNT switches (such as, for example, an RX filter switch and a TX filter switch). The filter switch 219 is connected to a filter system 218 that provides a pair of band pass filters (one band pass filter for the transmitter (TX) and one band pass filter of the receiver (RX)) for each of the communication channels that may be used by the AP 601A. Of course, the filter system 218 may have more or less sub-bands depending upon the configuration of the AP 601A and implementation of the scheme described with respect to FIGS. 3A-3C.

As shown in FIG. 6A, the filter system 218 includes pairs of band pass filters grouped together by designated sub-band, such as TX A and RX A, TX B and RX B, . . . TX N and RX N. In this example, each of the sub-band designations indicates a pair of band pass filters. For example, sub-band A corresponds to TX band pass filters 612 and RX band pass filter 619, sub-band B corresponds to TX band pass filter 622 and RX band pass filter 629, and so on to sub-band E which corresponds to the last pair of filters, TX band pass filter 652 and RX band pass filter 659.

Similar features may be incorporated into other devices, such as an end user device which is described in more detail with reference to FIG. 6B. FIG. 6B is a high-level functional block diagram of an example of an end user device implemented in a time division duplex (TDD) configuration for providing access to shared radio frequency spectrum.

System 600B of FIG. 6B includes a EUD 601B and client device 680 in which the EUD 601B provides a connection to the data network 107 for the client device 680. In other words, the EUD 601B is used as a "slave" transceiver for the AP 601A to exchange data with the EUD 601B. The EUD 601B includes a local controller 660B, a filter system 206A, and a communication component 210A. The controller 210B, filter system 205B and local controller 650B of EUD 601B are similar to, or the same as, the controller 210A, filter system 205A and local controller 650A in the AP 601A, and perform substantially the same functions, so a detailed discussion of the operation of the EUD 601B is not provided.

Unlike the AP 601A, the EUD 601B does not include a GPS receiver/reporter 660 and the local controller 660B may or may not be configured differently than local controller 650A. Instead of providing data communication services to an EUD as does the communication component 210A of the AP 601A, the communication component 210A of the EUD 601B provides data communication services to a client device 680, such as a laptop, a personal computer or a tablet device. Other than the end user of the transmitted data, the communication components 210A in both the AP 601A and the EUD 601B may be the same. Thus, a detailed description of the communication component 210A of the EUD 601B is not provided as the description would be duplicative of that provided with respect to the communication component 210A of the AP 601A.

Another difference between the AP 601A and the EUD 601B is that the client device 680 and the EUD 601B have no direct connection to a data network 107. Instead, the EUD 601B wirelessly obtains access to data network 107 (i.e., Internet or intranet) via the AP 601A, which is similar to using a Wi-Fi 802.11 access point. For example, the EUD 601B may be configured as a dongle that connects to a universal serial bus (USB) port of a laptop device to wirelessly connect to via an AP, such as AP 601A, to obtain wireless Internet access. Since the EUD 601B has no direct internet connectivity, the control mechanism signals (e.g., encrypted signal and control signals) are received via an over-the air interface.

At start up, the EUD 601B connects in some manner with an AP, such as AP 601A. For example, the local controller 650B may scan a subset of all communications channels (e.g., 1-N) to locate an AP communicating on an available communication channel. Alternatively, the EUD 601B may attempt to establish a connection via the last communication channel to which the EUD 601B was tuned. Of course, other methods of establishing initial contact with an AP are known and may be used.

The processing of the encrypted signal token by the filter controller 213 will be described in more detail with respect to FIG. 7. The encrypted signal token may include information that indicates that the encrypted signal token for a single use (the token may be used only once for one defined interval. The encrypted signal token may include timing information that allows the token to expire. The encrypted signal token may include rolling code features for additional security.

FIG. 7 illustrates an example of the process 700 that the filter controller 213 performs in response to receipt of an encrypted signal from an ASA controller 106. The filter controller 213 receives encrypted signals via a local controller, such as local controller 550A, 550B, 650A or 650B, in the respective APs 501A, 501B, 601A, and 601B (705). The filter controller 213 processor executes encrypted instructions to decrypt the received, encrypted signal (710). As mentioned above, the encryption and decryption keys may be similar for all APs, so the processor may obtain decryption key(s) from a memory within the filter controller circuitry. Alternatively, the filter controller 213 may have decryption key(s) that are specific to the particular filter controller 213. For example, a filter controller 213 in another AP may have decryption keys different from the decryption keys of filter controller 213 in AP 501A. The encryption technique, for example, used to encrypt the encrypted signal may be a public key encryption technique or other similar technique.

In another alternative, the encrypted signal, for example, may have bits that indicate the locations of an encrypted tuning control word (used by the tuning controller to tune the communication component) and a filter control word, and the filter controller 213 may parse the encrypted signal to locate an encrypted filter control word. The filter controller 213 may then decrypt only the encrypted filter control word. Of course, other methods of locating the filter control word in encrypted signal may be used.

In response to the decryption of the encrypted signal, the filter controller 213 processor parses (720) the decrypted filter control word to identify filter selection word. In an example, the filter controller 213 may have a provision for any filter selection word to expire, so that the filter controller 213 may not remain indefinitely locked onto one channel or one sub-band after original tuning. To facilitate the expiration of the filter selection word, a timing word may provide an indicator of a duration of a communication time interval.

The timing word may be an additional encrypted code that indicates a communication time interval may be a time duration of the filter selection word. For example, the timing word may be a code word that indicates a specific expiration time and date (e.g. 130001012014—where the time is 1300 hours on Jun. 21, 2014), a time period from a predetermined date, where the predetermined date is the date on which the access point last received an encrypted signal, a set number of hours, minutes or seconds (e.g. 5), or some other indicator of an expiration time.

In an example, the filter controller 213 includes a provision for all filter selection words to expire, so that the filter system 218 may not remain indefinitely locked onto one channel or one sub-band after original tuning for an extended period of time. At the expiration of, or close to, the expiration of a filter selection word, a new encrypted signal is provided by the ASA controller 106, or a new channel allocation request may be made by the tuning controller, such as tuning controller 530 or 630R/630T through the respective local controller 550A/650B for a new encrypted signal. For example, the filter controller 213 may be configured to not store previous communication channel filter settings or reuse previously provided encrypted signals. The decryption method is internal to the filter controller 213, therefore, the filter controller 213 may need timing information (input from an external source such as the data network 107 or the ASA controller 106 or the GPS receiver/reporter 560/660) to ensure expiration does occur and occurs at the correct time. Alternatively, the timing information may be maintained internal to the AP 501A/601A by either the local controller 550A/650A or the filter controller 213 using or the GPS receiver/reporter 560/660, for example, an internal clock that may be calibrated using time information from an external source. The timing information (which may also be supplied by the ASA controller 106 (i.e. external source) may also be encrypted to prevent spoofing of the timing information, for example, to make old encrypted signals appear younger by altering the apparent date or time compared to the expiration date or time.

Returning to FIG. 7, at 720, the decrypted signal is parsed to identify a timing word and a filter selection word. In addition to the timing and filter selection words, expiration data (e.g. expiration time, time information related to the ASA controller 106, a clock setting parameter for setting a clock internal to the filter controller 213 and the like) related to each of the timing and filter selection words may be obtained from the decrypted signal. The parsed filter selection word may indicate a specific sub-band filter or specific frequency in the shared radio frequency spectrum frequency bands that is allocated by the ASA controller 106 to the AP 501A/601A and any EUDs that will be communicating with the AP 501A/601A.

After the decrypted signal has been parsed, the filter controller 213 sets the filter selection word expiration according to the decrypted timing word (730). The decrypted timing word may be stored in a memory accessible by the filter controller 213 with timing information previously stored in the memory.

One technique for maintaining security of the channel allocations and the encryption methods for generating encrypted signals is to continuously change the encryption at various times (e.g. rolling secure codes), and use new encrypted signals to indicate the change in channel allocation or sub-band selection. The newly provided encrypted signal is a new encryption (e.g. new encryption/decryption keys are exchanged between the AP 501A/601A and the ASA controller 106) and a new channel allocation, where the new channel allocation may or may not be the same as the previous channel allocation. This is performed, for example, based on the timing word.

For example, an encrypted signal token may be decrypted to provide a synthesizer selection word indicating channel 4 for channel tuning and a filter selection word indicating sub-band B has been allocated for selection of a filter (or filter pair in an FDD implementation), and, according to the timing word, the filter selection corresponding to sub-band B expires in 10 minutes from the expiration time of a previously-received encrypted signal. Within the 10 minute time window, the ASA controller 106 provides a next, or updated, encrypted signal that is passed to the filter controller 213. The updated encrypted signal indicates a change of a frequency and a change of filter (e.g. a band pass filter change from a channel 4 and sub-band B to channel 13 and sub-band E (see, for example, FIG. 3A). The updated encrypted signal is parsed to identify the respective channel selection word, filter selection word, and the timing word. The timing word may include an expiration time as well as a timestamp of when the updated encrypted signal was generated by the ASA controller 106.

The next channel is channel 13 and the next sub-band is sub-band E and the expiration time is 3 minutes from the expiration time of the previous encrypted signal (i.e. after the end of the 10 minute time window). The time may be maintained as continuous time such as 123456 in seconds, minutes or other units with a date indicator. For example, the 10 minute expiration time may be indicated in the timing word as 123466 or, if in seconds as 600 seconds, in which case, the timing word will indicate the expiration time as 124056 (i.e. 123456+600) with a data indicator of Ser. No. 12/312,015 (i.e. Dec. 31, 2015).

As a result of the rolling codes, there is not a one-to-one match between designated sub-bands and filter selection words that can be observed or deciphered by observing or storing old instructions and their resultant sub-band selections. Together, the rolling code and encryption minimizes the probability of deciphering the encryption methods. So the secure filter selection word has a filter selection word timestamp that causes the filter selection word to expire by the next timeslot, and every secure filter selection word appears new and unique.

At 740, the filter selection word is parsed by the filter controller 213 processor to identify a filter selection word and a filter selection control timestamp.

In response to identifying the filter selection word and the filter selection word timestamp, the filter controller 213 processor compares, at 750, the expiration time of the received filter selection word to the filter selection word timestamp to determine if the received selection code has expired. Based on the comparison, a determination is made, at 760, whether the filter selection word has expired. In response to a determination that the filter selection word has not expired (i.e. "No") at 760, the process 700 proceeds to 770 in which the filter controller 213 processor generates a signal based on the filter selection word. In addition, the expiration time based on the next filter selection word expiration time is set. In the case of an AP, the process 700 proceeds to 780 in which the encrypted signal used for the sub-band selection in step 770 is further transmitted to the end user device(s) so any end user device(s) connected to the access point may select to the designated sub-band. However, in the case of a EUD, the process step 780 is not performed.

Alternatively, in response to a determination that the filter selection word has expired (i.e. "Yes") at 760, the process 700 requests a new sub-band designation from the ASA controller 106 and proceeds to 770.

In another example, the filter controller 213 is implemented as an ASIC without firmware or software. The ASIC includes a hardware implementation of the filter controller 213 that allows decrypting and decoding of the encrypted signal token. In which case, the encryption/decryption logic is implemented in the circuitry of the ASIC. The ASIC may also include a standardized serial or parallel data interface in order to accept the encrypted signal token. The ASIC may also include a hardware implementation of the filter system 205A/205B to allow decrypting and decoding of the encrypted signal token.

Figure 8:
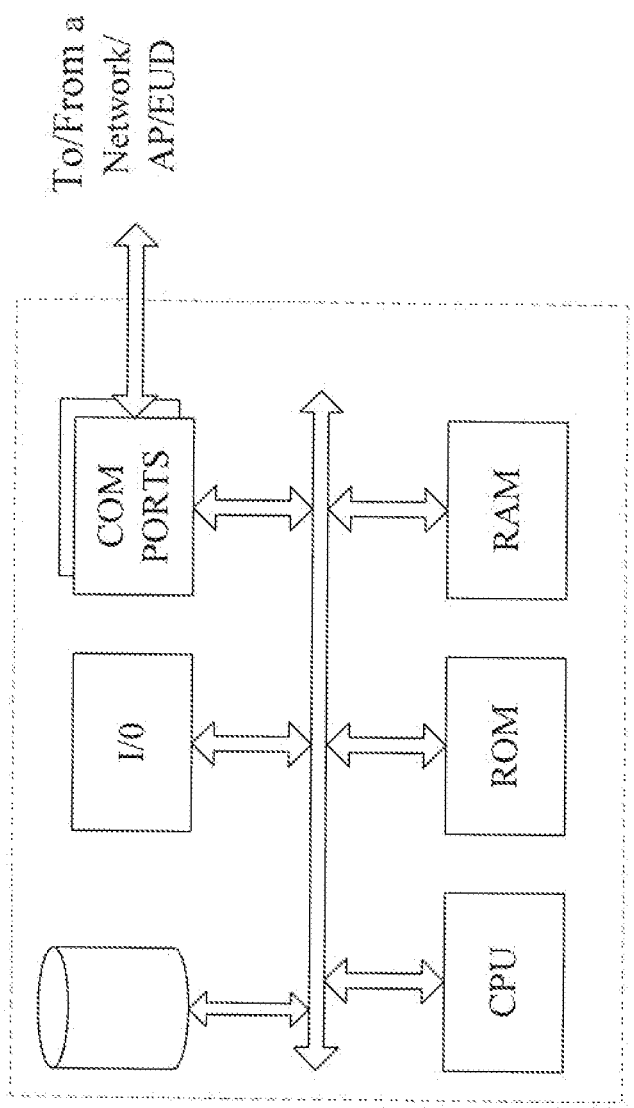
FIG. 8 is a simplified functional block diagram of a computer that may be configured, for example, to function as a local controller or secure controller in, or coupled to, an access point and/or an end user device in the examples of an authorized shared access system of FIGS. 1-8.

FIG. 8 provides a functional block diagram illustration of general purpose computer hardware platform, as may typically be used to implement a server or one or more of the examples of a local controller, tuning controller, or the ASA controller.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Alternatively, a general purpose computer configured to operate as a controller or processor within an access point device or end user device, for example, includes a data communication interface for packet data communication. The access point device or end user device also includes a central processing unit (CPU), in the form of one or more processors, for executing program instructions. The access point or end user device platform typically includes an internal communication bus, program storage and data storage for various data files to be processed and/or communicated by the access point device or end user device, although the access point device or end user device often receives programming and data via network communications. The hardware elements, operating systems and programming languages of such access point or end user devices are conventional in nature. Of course, the access device or end user device functions may be implemented in a distributed fashion on a number of similar platforms, to distribute the processing load.

The use of an encrypted signal token, an integrated SPNT switch, an ASIC and encryption methods allows the remote ASA controller system to securely control use of the different sub-bands. This would allow the ASA controller to take the sub-banding into account when allocating channels, thereby allowing higher packing of users in densely subscribed areas by using channels in different sub-bands for nearby users. This is especially valuable in the case of high power users or different class (different use cases), such as segmenting radar uses into a separate sub-band. Other use cases include more densely allocating communication channels to similarly tiered users. For example, a number of Tier 3 users may be allocated a number of communication channels in a particular sub-band because the likelihood of interference between them is minimal.

Other use cases may require more or less protection from interference with respect to the nearest distance for co-channel channel allocation, or use of different sub-bands to avoid co-channel or non-co-channel interference. Besides very high power radar use cases, other higher powered use cases might include point-to-point communications with higher powered transmitters or very narrow antenna beam widths (high gain antennas), non-line-of-sight (NLOS) backhaul use cases with higher power, and sectorized macrocell use cases with both higher amplifier powers and sectorized antennas (with higher antenna gain than omnidirectional antennas).

Additionally, the use of the encrypted signal token and cryptography techniques for security provides additional security and protection for the use and sensing of the channels. This too may be a valuable feature for the ASA controller in securing some set of channels from unauthorized use. Furthermore, the use of a hardware based securely controlled SPNT switch removes such control from the air interface itself, and allows this 'over-the-top' secure control technology to be easily incorporated into any transceiver design, regardless of the air interface protocols.

More broadly, the disclosed examples may be applied to any band incorporating shared access, where the concepts of allocated, coordinated or brokered sharing of a set of channels and the use of a Licensed Shared Access (LSA) system or ASA system is used. By incorporating sub-band filtering (multiplexing) the high power/low power interference problem (large exclusion zones) may be mitigated or eliminated. In addition, by using an encrypted signal token concept to directly control the local band pass filter switching, the remote ASA controller 106 can effectively secure the sub-band selection and usage. The foregoing examples are also useful where it is desired to operate both high powered and low powered systems in the same area on a shared basis. This can be accomplished for TDD or FDD systems.

A number of the controllers, and/or the server(s) described above may be implemented using programmable processors or computers. In such implementation examples, aspects of the methods of front end filter selection in a shared radio frequency spectrum access system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the shared access system into the computer platform of the AP or EUD that will be the filter controller. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the front end communication channel filter system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a device, an encrypted signal token indicating an available communication channel from among a plurality of channels in a shared access radio frequency spectrum,
      the device sharing the plurality of channels in the shared access radio frequency spectrum with a high power emitting system;
   parsing, by the device, the encrypted signal token to identify an encrypted filter control word;
   decrypting, by the device, the encrypted filter control word to identify a first selection word and a timing word,
      the timing word being associated with an expiration parameter;
   setting, by the device, an expiration time of the first selection word to the expiration parameter;
   comparing, by the device, the expiration time of the first selection word to time information associated with a second selection word;
   selecting, by the device and based on comparing the expiration time of the first selection word to the time information associated with the second selection word, a sub-band filter from among a plurality of sub-band filters; and
   establishing, by the device and via the selected sub-band filter, a communication path for signals in the available communication channel between a communication component and an antenna of the device.

2. The method of claim 1, further comprising:
   tuning a transmitter or receiver in the communication component to the available communication channel to selectively transmit or receive data, on the available communication channel, via the selected sub-band filter and the antenna.

3. The method of claim 1, further comprising:
   tuning a transceiver of the communication component to the available communication channel for communicating with an external device, on the available communication channel, via the selected sub-band filter and the antenna; and
   exchanging data with the external device via the communication path,
      where the available communication channel is a single communication channel within a frequency sub-band associated with the selected sub-band filter.

4. The method of claim 1, further comprising:
   identifying, based on decrypting the encrypted signal token, the available communication channel,
      the available communication channel indicating a first channel and a second channel in a frequency sub-band, and
      the selected sub-band filter comprises a pair of sub-band filters;
   tuning a communication component to the first channel for uplink communication and to the second channel for downlink communication;
   selecting a first sub-band filter, of the pair of sub-band filters, that passes uplink communication signals in the first channel from the communication component to the antenna and minimizes interference from other frequency sub-bands; and selecting a second sub-band filter, of the pair of sub-band filters, that passes downlink communication signals in the second channel from the antenna to the communication component and minimizes interference from other frequency sub-bands.

5. The method of claim 1, further comprising:
receiving a data communication, via the available communication channel, from an end user device,
the received data communication including at least one of audio data, video data, or document data; and
formatting the received data communication for transmission to a data network.

6. The method of claim 1, further comprising:
selecting an additional sub-band filter from among a plurality of sub-band filters; and
establishing, via the additional sub-band filter, a communication path, for signals in a communication channel corresponding to the additional sub-band filter, between the communication component and the antenna.

7. The method of claim 1, further comprising:
transmitting position coordinates of the device to a controller device; and
transmitting an identifier of the device to the controller device,
the encrypted signal token being received from the controller device and providing an allocation of the available communication channel based on the position coordinates and the identifier.

8. The method of claim 7, where the encrypted signal token is received by the device based on transmitting the position coordinates and the identifier.

9. A device comprising:
a memory to store instructions; and
a processor to execute the instructions to:
receive an encrypted signal token indicating an available communication channel from among a plurality of channels in a shared access radio frequency spectrum,
the device sharing the plurality of channels in the shared access radio frequency spectrum with a high power emitting system;
parse the encrypted signal token to identify an encrypted filter control word;
decrypt the encrypted filter control word to identify a first selection word and a timing word,
the timing word being associated with an expiration parameter;
set an expiration time of the first selection word to the expiration parameter;
compare the expiration time of the first selection word to time information associated with a second selection word;
select, based on comparing the expiration time of the first selection word to the time information associated with the second selection word, a sub-band filter from among a plurality of sub-band filters; and
establish, via the selected sub-band filter, a communication path for signals in the available communication channel between a communication component and an antenna of the device.

10. The device of claim 9, where the processor is further to:
tune a transmitter or receiver in the communication component to the available communication channel to selectively transmit or receive data, on the available communication channel, via the selected sub-band filter and the antenna.

11. The device of claim 9, where the processor is further to:
tune a transceiver of the communication component to the available communication channel for communicating with an external device, on the available communication channel, via the selected sub-band filter and the antenna; and
exchange data with the external device via the communication path,
where the available communication channel is a single communication channel within a frequency sub-band associated with the selected sub-band filter.

12. The device of claim 9, where the processor is further to:
identify, based on decrypting the encrypted signal token, the available communication channel,
the available communication channel indicating a first channel and a second channel in a frequency sub-band, and
the selected sub-band filter comprises a pair of sub-band filters;
tune a communication component to the first channel for uplink communication and to the second channel for downlink communication;
select a first sub-band filter, of the pair of sub-band filters, that passes uplink communication signals in the first channel from the communication component to the antenna and minimizes interference from other frequency sub-bands; and
select a second sub-band filter, of the pair of sub-band filters, that passes downlink communication signals in the second channel from the antenna to the communication component and minimizes interference from other frequency sub-bands.

13. The device of claim 9, where the processor is further to:
select an additional sub-band filter from among a plurality of sub-band filters; and
establish, via the additional sub-band filter, a communication path, for signals in a communication channel corresponding to the additional sub-band filter, between the communication component and the antenna.

14. The device of claim 9, where the processor is further to:
transmit position coordinates of the device to a controller device; and
transmit an identifier of the device to the controller device,
the encrypted signal token being received from the controller device and providing an allocation of the available communication channel based on the position coordinates and the identifier.

15. A non-transitory computer readable medium storing instructions, the instructions comprising:
one or more instructions which, when executed by a processor of a device, cause the processor to:
receive an encrypted signal token indicating an available communication channel from among a plurality of channels in a shared access radio frequency spectrum,
the device sharing the plurality of channels in the shared access radio frequency spectrum with a high power emitting system;
parse the encrypted signal token to identify an encrypted filter control word;
decrypt the encrypted filter control word to identify a first selection word and a timing word,
the timing word being associated with an expiration parameter;

set an expiration time of the first selection word to the expiration parameter;
compare the expiration time of the first selection word to time information associated with a second selection word;
select, based on comparing the expiration time of the first selection word to the time information associated with the second selection word, a sub-band filter from among a plurality of sub-band filters; and
establish, via the selected sub-band filter, a communication path for signals in the available communication channel between a communication component and an antenna of the device.

16. The non-transitory computer readable medium of claim 15, where the instructions further include:
tune a transmitter or receiver in the communication component to the available communication channel to selectively transmit or receive data, on the available communication channel, via the selected sub-band filter and the antenna.

17. The non-transitory computer readable medium of claim 15, where the instructions further include:
tune a transceiver of the communication component to the available communication channel for communicating with an external device, on the available communication channel, via the selected sub-band filter and the antenna; and
exchange data with the external device via the communication path,
where the available communication channel is a single communication channel within a frequency sub-band associated with the selected sub-band filter.

18. The non-transitory computer readable medium of claim 15, where the instructions further include:
identify, based on decrypting the encrypted signal token, the available communication channel,
the available communication channel indicating a first channel and a second channel in a frequency sub-band, and
the selected sub-band filter comprises a pair of sub-band filters;
tune a communication component to the first channel for uplink communication and to the second channel for downlink communication;
select a first sub-band filter, of the pair of sub-band filters, that passes uplink communication signals in the first channel from the communication component to the antenna and minimizes interference from other frequency sub-bands; and
select a second sub-band filter, of the pair of sub-band filters, that passes downlink communication signals in the second channel from the antenna to the communication component and minimizes interference from other frequency sub-bands.

19. The non-transitory computer readable medium of claim 15, where the instructions further include:
select an additional sub-band filter from among a plurality of sub-band filters; and
establish, via the additional sub-band filter, a communication path, for signals in a communication channel corresponding to the additional sub-band filter, between the communication component and the antenna.

20. The non-transitory computer readable medium of claim 15, where the instructions further include:
transmit position coordinates of the device to a controller device; and
transmit an identifier of the device to the controller device, the encrypted signal token being received from the controller device and providing an allocation of the available communication channel based on the position coordinates and the identifier.

* * * * *